(12) United States Patent
Fukui et al.

(10) Patent No.: US 7,453,471 B2
(45) Date of Patent: Nov. 18, 2008

(54) SERVICE PROVIDING SYSTEM, MANAGEMENT TERMINAL, MOBILE MEMBER, SERVICE PROVIDING PROGRAM, AND SERVICE PROVIDING METHOD

(75) Inventors: Yoshiki Fukui, Suwa (JP); Shinya Taniguchi, Suwa (JP); Naruhide Kitada, Fujimi-cho (JP)

(73) Assignee: Seiko Epson Corporation, Tokyo (JP)

( * ) Notice: Subject to any disclaimer, the term of this patent is extended or adjusted under 35 U.S.C. 154(b) by 232 days.

(21) Appl. No.: 10/054,818

(22) Filed: Jan. 25, 2002

(65) Prior Publication Data

US 2002/0114626 A1 Aug. 22, 2002

(30) Foreign Application Priority Data

Feb. 9, 2001 (JP) ............................. 2001-034349
Jan. 11, 2002 (JP) ............................. 2002-004941

(51) Int. Cl.
*G06T 15/00* (2006.01)
(52) U.S. Cl. ....................... 345/633; 345/629
(58) Field of Classification Search .......... 345/629–633
See application file for complete search history.

(56) References Cited

U.S. PATENT DOCUMENTS

| | | | | |
|---|---|---|---|---|
| 6,023,241 | A | 2/2000 | Clapper | 342/357.13 |
| 6,073,075 | A | 6/2000 | Kondou et al. | 701/203 |
| 6,119,045 | A * | 9/2000 | Bolmsjo | 607/156 |
| 6,169,987 | B1 * | 1/2001 | Knoblock et al. | 707/10 |
| 6,199,045 | B1 | 3/2001 | Giniger et al. | |
| 6,236,358 | B1 * | 5/2001 | Durst et al. | 342/357.09 |
| 6,326,918 | B1 * | 12/2001 | Stewart | 342/457 |
| 6,338,013 | B1 * | 1/2002 | Ruffner | 701/23 |

(Continued)

FOREIGN PATENT DOCUMENTS

EP 0 998 159 A1 5/2000

(Continued)

OTHER PUBLICATIONS

Piekarski, Wayne and Bruce H. Thomas. "Tinmith MetroL: New Outdoor Techniques for Creating City Models with an Augmented Reality Wearable Computer." pp. 31-39. 2001 IEEE Conf. on Wearable Computers. ☐☐*

(Continued)

*Primary Examiner*—Phu K Nguyen
(74) *Attorney, Agent, or Firm*—Oliff & Berridge, PLC

(57) ABSTRACT

The invention provides a service providing system which allows the user to easily receive service, which allows the user to receive not only information providing service but a variety of services, and which can flexibly handle a change in condition. The invention can include a virtual-object management apparatus that associates object information related to the shape and the location of a virtual object with service information and stores them, and sends the object information and the service information stored in a virtual-object management database to a digital camera in response to a transmission request sent from the digital camera. When the digital camera determines, from the obtained location information and the received object information, that the digital camera is disposed in the inside area of the virtual object identified by the shape and location of the virtual object, it can execute an action corresponding to the virtual object, according to the received service information.

29 Claims, 13 Drawing Sheets

U.S. PATENT DOCUMENTS

| | | | |
|---|---|---|---|
| 6,343,317 B1 * | 1/2002 | Glorikian | 709/218 |
| 6,433,818 B1 * | 8/2002 | Steinberg et al. | 348/161 |
| 6,473,762 B1 * | 10/2002 | Knoblock et al. | 707/100 |
| 7,110,552 B1 * | 9/2006 | Saliterman | 381/77 |
| 2002/0021231 A1 * | 2/2002 | Schlager et al. | 340/984 |
| 2002/0032037 A1 * | 3/2002 | Segawa | 455/517 |
| 2002/0077060 A1 * | 6/2002 | Lehikoinen et al. | 455/41 |
| 2002/0111188 A1 * | 8/2002 | Harma et al. | 455/556 |
| 2005/0245190 A1 | 11/2005 | Meyer et al. | |

FOREIGN PATENT DOCUMENTS

| | | |
|---|---|---|
| JP | 10013720 A | 1/1998 |
| JP | A 10-285657 | 10/1998 |
| JP | 2000152125 A | 5/2000 |
| JP | WO 00/76154 A1 | 12/2000 |
| JP | 2001-034378 | 2/2001 |
| WO | WO 98/08314 | 2/1998 |
| WO | WO 99/18745 | 4/1999 |
| WO | WO 00/19642 | 4/2000 |
| WO | WO 01/48624 A1 | 7/2001 |

OTHER PUBLICATIONS

Morishita et al., "Design and Implementation of the SpaceTag Prototype System: An Object System with Spatio-temporarily Limited Access," Information Processing Society of Japan, vol. 41, No. 10, pp. 2689-2697, Oct. 2000.

European Search Report EU 1413B, Dec. 1, 2005, pp. 1-11.

* cited by examiner

400 VIRTUAL-OBJECT MANAGEMENT TABLE

| SERIAL NUMBER | BASE POINT (x,y,z) | SHAPE | RANGE VALUE (m) | ACTION | SUPPLEMENTARY INFORMATION |
|---|---|---|---|---|---|
| 1 | 10,50,20 | CUBE | 5 | CAPTURING PROHIBITION | NULL |
| 2 | 20,30,20 | RECTANGULAR PARALLELEPIPED | 5,10,10 | CAPTURING PROHIBITION | NULL |
| 3 | 30,40,20 | SPHERE | 5 | INDICATION OF DESCRIPTION | THIS PICTURE IS... |
| n | 40,50,20 | SPHERE | 5 | INDICATION OF DESCRIPTION | THIS PICTURE IS... |

402, 404, 406, 408 — OBJECT INFORMATION
410, 412 — SERVICE INFORMATION

FIG. 4

SERVICE PROVIDING SYSTEM, MANAGEMENT TERMINAL, MOBILE MEMBER, SERVICE PROVIDING PROGRAM, AND SERVICE PROVIDING METHOD

BACKGROUND OF THE INVENTION

1. Field of Invention

The present invention relates to systems, terminals, mobile members, programs, and methods which associates service with a virtual object, disposes the virtual object in a virtual space associated with an actual space, and provides service according to a positional relationship between a mobile member, such as a portable telephone, and the virtual object, and more particularly, to a service providing system, a management terminal, a mobile member, a service providing program, and a service providing method which allow the user to easily receive service, which allow the user to receive not only information providing service but a variety of service, and which can flexibly handle a change in condition.

2. Description of Related Art

As systems for providing information according to the movement of the user, there have been conventionally known, for example, an information providing means (hereinafter called a first conventional case) disclosed in Japanese Unexamined Patent Publication No. Hei-10- 13720, and a head-mount display apparatus (hereinafter called a second conventional case) disclosed in Japanese Unexamined Patent Publication No. 2000-152125.

In the first conventional case, detection sections 103 and 104 detect the location and direction of a camera 101 by a global positioning system (GPS), and the user specifies an object in an image displayed on a display or finder 108. A control section 106 obtains the location information of the specified object by calculation, according to the specified location, and the detected location and direction, takes out the attribute data corresponding to the object from a map-data storage section 107 by using the obtained location information, and displays on the display or finder 108 or output after sound synthesis.

Therefore, the attribute data of the object in the displayed image can be easily obtained and shown to the user.

In the second conventional case, an icon image is displayed on an image output section 5 at a position corresponding to the line of sight detected by a line-of-sight detection section 8, by an input from an operation input section 6. To an eye of an operator, the icon image overlaps an actual field of sight seen from a window section. The operator moves the line of sight to a desired position in the field of sight, and fixes it by an instruction from the operation input section 6. For example, when a text actually located in front of the user is observed and a certain area is specified in the text, a sentence or word in the specified area is read by an image processing section 7 from image information input from a CCD camera section 3, translated into a desired language, and displayed on the image output section 5.

Therefore, an object in an actual field of sight can be selected and specified by the movement of the line of sight of the operator, and image information in the field of sight can be processed by using the line of sight as input means.

In the first conventional case, when the user specifies an object in an image displayed on the display or finder 108, the attribute data of the object is provided. Therefore, even when an object associated with attribute data effective to the user exists close to a location where the user is currently located, however, unless the user actively moves, the user cannot obtain the effective attribute data.

In addition, since attribute data is provided for the user, the user can only obtain a service of receiving information. For example, a demand of the user for printing the content of the attribute data associated with an object on site is difficult to achieve. Of course, it is possible that the attribute data is stored in a memory and the attribute data is printed later at a printer placed at the home of the user, but it is not very convenient and the demand for printing the data on site cannot be satisfied.

Further, since the user or an administrator cannot generate, delete, or update an object or attribute data, it is very difficult that the system is applied to a new object such as a building or to an object only temporarily located at a place, such as an exhibition, or that users transfer information to and from each other. When a case in which users transfer information to and from each other is taken as an example, if a user makes a comment on a picture in an art museum in the first conventional case, for example, it is impossible for another user to browse the comment as attribute data when the another user stands in front of the same picture on another day.

Also in the second conventional case, in the same way as in the first conventional case, since translation is performed when the user observes a text placed in front of the user and specifies an area in the text, unless the user actively performs an action, the user cannot receive a service of translation, in the same way as in the first conventional case.

In addition, since a translated text is provided for the user, the user can obtain only information providing service as in the first conventional case.

SUMMARY OF THE INVENTION

The present invention has been made in consideration of the unsolved issues included in the conventional technologies. It is an object of the present invention to provide a service providing system for dynamically providing service for movement, a management terminal, a mobile member, a service providing program, and a service providing method which allow the user to easily receive service, which allow the user to receive not only information providing service but a variety of service, and which can flexibly handle a change in condition.

To achieve the foregoing object, a service providing system of the present invention is a service providing system for associating service with a virtual object, for disposing the virtual object in a virtual space associated with an actual space, and for providing service corresponding to the virtual object according to a positional relationship between a movable mobile member and the virtual object, including storage means for associating object information related to the shape and location of the virtual object with service information specifying a service content and for storing them; and location-information acquisition means for obtaining location information used for identifying the location of the mobile member, wherein, when it is determined according to the location information obtained by the location-information acquisition means and the object information stored in the storage means that the mobile member is disposed in the inside area of the virtual object identified by the shape and location of the virtual object, service corresponding to the virtual object is provided according to the service information stored in the storage means.

With such a structure, the location-information acquisition means obtains location information, and it is determined according to the obtained location information and the object information stored in the storage means whether the mobile member is disposed in the inside area of the virtual object identified by the shape and location of the virtual object. As a result, when it is determined that the mobile member is disposed in the inside area of the virtual object, service corresponding to the virtual object is provided according to the service information stored in the storage means.

Also, with such a structure, a virtual object has a logical shape and a location in a virtual space associated with an actual space. The shape may be, for example, a sphere having the center at the location and a radius of about 1 m, or may be a cube having the center at the location and a side length of about 1 m. Alternatively, the shape can be any shape, including a shape obtained by imitating a natural thing or a living thing. The shape is not limited to a three-dimensional shape, and may be a plane shape.

Therefore, since an area where service is provided is relatively clarified, different services can be provided in fine units, such as in units of several meters. In addition, since an area where service is provided is not a point but has a predetermined range, the user is more likely to receive the service. The same points are applied to service providing programs and to service providing methods which has above structure.

Further, the mobile member may be a mobile member in the actual space, or may be that in a virtual space. In the former case, a portable telephone or a vehicle corresponds to the above mobile member. When the present invention is applied to a portable telephone or a vehicle, for example, service can be provided according to the location of the user. In the latter case, a mobile member on a computer simulation or a mobile member in a game corresponds to the above mobile member. When the present invention is applied to a computer simulation, service can be provided according to the location of a mobile member in a virtual space. The same points are applied to service providing systems, to a mobile member, service providing programs, and service providing methods.

Further, provided service includes any service, and is not limited to information providing service. It may be, for example, service implemented by operating a mobile member or another apparatus, and may be service for giving the users a predetermined benefit, such as discount. The same points are applied to service providing systems, service providing programs, and service providing methods.

Further, the storage means stores object information with the use of any means at any time. The storage means may store object information in advance. Alternatively, the storage means may store object information by an external input while the apparatus is operating, without storing the object information in advance.

This is also applied to storage of service information. The same points are applied to service providing systems, to a management terminal, to service providing programs, and to service providing methods.

Further, the present system may be implemented as a single apparatus, or may be implemented as a network system in which a plurality of terminals are connected in a communication-allowed manner. In the latter case, each component needs to be connected in a communication-allowed manner. Each component may be connected to any of the plurality of terminals. The same points are applied to service providing systems.

Further, for example, the location-information acquisition means may obtain location information by measuring the location of the mobile member by the use of a communication terminal to which the mobile member is connected in a communication-allowed manner. The location-information acquisition means may obtain location information by measuring the location of the mobile member in the mobile member with the use of a GPS, or by a calculation performed by the communication terminal according to measurement information sent from the mobile member. The location-information acquisition means may obtain location information by measuring the location of the mobile member in a base station connected to the mobile member, or by a calculation performed by the communication terminal according to measurement information sent from the base station. As an example system in which the mobile member and the above-described communication terminal are used in combination, a system using a radio-frequency identification (RFID) can be used. More specifically, a non-contact-type tag from which the tag ID can be read in a non-contact manner is attached to the mobile member, and tag-ID reading means for reading the tag ID of a non-contact-type tag from the tag in a non-contact manner is provided for the communication terminal. When the communication terimnal detects the mobile member by the use of the tag-ID reading means, the location-information acquisition means obtains the position of the communication terminal as the location information of the mobile member. In this case, the communication terminal itself can serve as tag-ID reading means. The same points are applied to service providing systems, to the mobile member, to service providing programs, and to service providing methods.

Further, a service providing system according to the present invention is a service providing system above, wherein the mobile member and a management terminal for managing the virtual object are connected in a communication-allowed manner; the mobile member has the location-information acquisition means, and sends the location information obtained by the location-information acquisition means to the management terminal; and the management terminal has the storage means, and when the management terminal receives the location information, it determines according to the received location information and the object information stored in the storage means whether the mobile member is disposed in the inside area of the virtual object identified by the shape and location of the virtual object.

With such a structure, the mobile member obtains location information from the location-information acquisition means, and sends the obtained location information to the management terminal.

When the management terminal receives the location information, it determines according to the received location information and the object information stored in the storage means whether the mobile member is disposed in the inside area of the virtual object identified by the shape and location of the virtual object.

Service can be provided at any place. An entity which provides service is not limited to the management terminal. The mobile member or another apparatus may provide service. When the management terminal provides service, for example, if it is determined that the mobile member is disposed in the inside area of a virtual object, the management terminal needs to provide service corresponding to the virtual object according to the service information stored in the storage means. When the mobile member provides service, for example, the management terminal sends a result of determination and service information corresponding to the virtual object, stored in the storage means to the mobile member, the mobile member receives the result of determination and the service information, and if the received result of determination indicates that the mobile member is disposed in the inside area of the virtual object, the mobile member needs to provide service corresponding to the virtual object according to the received service information.

Further, a service providing system according to the present invention is a service providing system above, wherein the mobile member and a management terminal for managing the virtual object are connected in a communication-allowed manner; the management terminal has the storage means, and sends the object information stored in the storage means to the mobile member; and the mobile member has the location-information acquisition means, and when the mobile member receives the object information, it determines according to the location information obtained by the location-information acquisition means and the received object information whether the mobile member is disposed in the inside area of the virtual object identified by the shape and location of the virtual object.

With such a structure, the management terminal sends object information stored in the storage means to the mobile member.

The mobile member obtains location information by the use of the location-information acquisition means. When the mobile member receives object information, it determines according to the location information and the received object information whether the mobile member is disposed in the inside area of the virtual object identified by the shape and location of the virtual object.

Service can be provided at any place. An entity which provides service is not limited to the mobile member. The management terminal or another apparatus may provide service. When the mobile member provides service, for example, the management terminal sends object information stored in the storage means and the service information corresponding thereto to the mobile member, the mobile member receives the object information and the service information, and if a result of determination indicates that the mobile member is disposed in the inside area of the virtual object, the mobile member needs to provide service corresponding to the virtual object according to the received service information. When the management terminal provides service, for example, the mobile member sends a result of determination to the management terminal, the management terminal receives the result of determination, if the received result of determination indicates that the mobile member is disposed in the inside area of a virtual object, the management terminal needs to provide service corresponding to the virtual object according to the service information stored in the storage means.

Further, a service providing system according to the present invention is a service providing system above, wherein, when the result of the determination indicates that the mobile member is disposed in the inside area of the virtual object identified by the shape and location of the virtual object, the management terminal provides service corresponding to the virtual object according to the service information stored in the storage means.

With such a structure, when the result of the determination indicates that the mobile member is disposed in the inside area of the virtual object identified by the shape and location of the virtual object, the management terminal provides service corresponding to the virtual object according to the service information stored in the storage means.

Further, a service providing system according to the present invention is a service providing system above, wherein the management terminal sends the service information stored in the storage means to the mobile member, and when the result of the determination indicates that the mobile member is disposed in the inside area of the virtual object identified by the shape and location of the virtual object, the mobile member provides service corresponding to the virtual object according to the received service information.

With such a structure, the management terminal sends service information stored in the storage means to the mobile member.

When the result of the determination indicates that the mobile member is disposed in the inside area of the virtual object identified by the shape and location of the virtual object, the mobile member provides service corresponding to the virtual object according to the received service information.

Further, a service providing system according to the present invention is a service providing system above, wherein the management terminal further includes input means for performing an input related to generation, deletion, or update of the object information, and object-information processing means for generating, deleting, or updating the object information according to the content of the input performed by the input means.

With such a structure, when the input means performs an input related to generation, deletion, or update of object information, the management terminal generates, deletes, or updates the object information according to an input content by the use of the object-information processing means.

The input means may allow a direct input to the management terminal. It may allow an input through communication with the mobile member or another apparatus.

Further, a service providing system according to the present invention is a service providing system above, wherein the service information is operation information specifying the content of an operation of the mobile member or another apparatus, and when it is determined that the mobile member is disposed in the inside area of the virtual object identified by the shape and location of the virtual object, the mobile member or the another apparatus is operated according to the operation information corresponding to the virtual object, stored in the storage means.

With such a structure, when it is determined that the mobile member is disposed in the inside area of the virtual object identified by the shape and location of the virtual object, the mobile member or the another apparatus is operated according to operation information corresponding to the virtual object, stored in the storage means.

Further, a service providing system according to the present invention is a service providing system above, wherein the service information specifies the content of service in which media information related to characters, images, or video is provided for the mobile member, and when it is determined that the mobile member is disposed in the inside area of the virtual object identified by the shape and location of the virtual object, the media information is provided for the mobile member according to the service information corresponding to the virtual object, stored in the storage means.

With such a structure, when it is determined that the mobile member is disposed in the inside area of the virtual object identified by the shape and location of the virtual object, media information is provided for the mobile member according to service information corresponding to the virtual object, stored in the storage means.

Further, a service providing system according to the present invention is a service providing system above, wherein the service information specifies the content of service in which notice information related to a notice or guidance information related to a guidance is provided for the mobile member, and when it is determined that the mobile member is disposed in the inside area of the virtual object identified by the shape and location of the virtual object, the notice information and the guidance information are provided for the mobile member according to the service information corresponding to the virtual object, stored in the storage means.

With such a structure, when it is determined that the mobile member is disposed in the inside area of the virtual object identified by the shape and location of the virtual object, notice information and guidance information are provided for the mobile member according to service information corresponding to the virtual object, stored in the storage means.

Further, a service providing system according to the present invention is a service providing system above, wherein the mobile member is a portable terminal.

With such a structure, the portable terminal obtains location information by the use of the location-information acquisition means. The portable terminal or the management terminal determines according to the obtained location information and the object information stored in the storage means whether the mobile member is disposed in the inside area of the virtual object identified by the shape and location of the virtual object.

Further, a service providing system according to the present invention is a service providing system for associating service with a virtual object, for disposing the virtual object in a virtual space associated with an actual space, and for providing service corresponding to the virtual object according to a positional relationship between a movable mobile member and the virtual object, including storage means for associating object information related to the virtual object with operation information specifying the content of an operation of the mobile member or another apparatus, and for storing them, wherein, when it is determined according to the object information stored in the storage means that the positional relationship between the mobile member and the virtual object satisfies a predetermined condition, the mobile member or the another apparatus is operated according to the operation information corresponding to the virtual object, stored in the storage means.

With such a structure, it is determined according to the object information stored in the storage means whether a positional relationship between the mobile member and the virtual object satisfies a predetermined condition.

As a result, when it is determined that the predetermined condition is satisfied, the mobile member or the another apparatus is operated according to operation information corresponding to the virtual object, stored in the storage means.

Also, with such a structure, the virtual object needs to have at least a logical location in a virtual space associated with an actual space, includes a virtual object at a point, which does not have a predetermined range, and also includes a virtual object which has a predetermined range but does not have a clear boundary. To configure an example virtual object having a predetermined area but not having a clear boundary, the RFID can be used. In this case, a non-contact-type tag from which the tag ID can be read in a non-contact manner is attached to the mobile member, and tag-ID reading means for reading the tag ID of a non-contact-type tag from the tag in a non-contact manner is provided. In other words, a space in which the tag-ID reading means can read a tag ID constitutes a virtual object. The same points are applied to service providing systems, to service providing programs, and to service providing methods which has above structure.

The predetermined condition is not limited to a condition that the location of the mobile member matches that of the virtual object. It includes, for example, a condition that the distance between the mobile member and the virtual object is a predetermined length or shorter, or a condition that a direction in which the virtual object sees the mobile member is a predetermined direction. The same points are applied to service providing programs, and to service providing methods.

Further, a service providing system according to the present invention can be a service providing system for associating service with a virtual object, for disposing the virtual object in a virtual space associated with an actual space, and for providing service corresponding to the virtual object according to a positional relationship between a movable mobile member and the virtual object. The present invention can include a storage device for associating object information related to the virtual object with service information specifying the content of service, and for storing them. wherein, when it is determined according to the object information stored in the storage means that the positional relationship between the mobile member and the virtual object satisfies a predetermined condition, the service corresponding to the virtual object is provided according to the service information stored in the storage means; and further including input means for performing an input related to generation, deletion, or update of the object information; and object-information processing means for generating, deleting, or updating the object information according to the content of the input performed by the input means.

With such a structure, when it is determined according to the object information stored in the storage means that the positional relationship between the mobile member and the virtual object satisfies a predetermined condition, service corresponding to the virtual object is provided according to the service information stored in the storage means. When the user, the system administrator, or another person performs an input related to generation, deletion, or update of the object information through the input means, the object-information processing means generates, deletes, or updates the object information according to the content of the input.

To achieve the foregoing object, a management terminal according to the present invention is a terminal connected to the mobile member used in a service providing system in a communication-allowed manner, including a storage means, wherein, when the terminal receives the location information, it determines according to the received location information and the object information stored in the storage means whether the mobile member is disposed in the inside area of the virtual object identified by the shape and location of the virtual object.

With such a structure, a function having the same level as the function of the management terminal in the service providing system is obtained.

To achieve the foregoing object, a mobile member according to the present invention is a mobile member connected to the management terminal used in a service providing system in a communication-allowed manner, including a location-information acquisition means, wherein, when the mobile member receives the object information, it determines according to the location information obtained by the location-information acquisition means and the received object information whether the mobile member is disposed in the inside area of the virtual object identified by the shape and location of the virtual object.

With such a structure, a function having the same level as the function of the mobile member in the service providing system is obtained.

To achieve the foregoing object, a service providing program according to the present invention is a service providing program for associating service with a virtual object, for disposing the virtual object in a virtual space associated with an actual space, and for providing service corresponding to the virtual object according to a positional relationship between a movable mobile member and the virtual object, the program making a computer which is capable of using storage means for associating object information related to the shape and location of the virtual object with service information specifying a service content and for storing them, and location-information acquisition means for obtaining location information used for identifying the location of the mobile member, execute processing in which, when it is determined according to the location information obtained by the location-information acquisition means and the object information stored in the storage means that the mobile member is disposed in the inside area of the virtual object identified by the shape and location of the virtual object, service corresponding to the virtual object is provided according to the service information stored in the storage means.

With such a structure, when the computer reads the program and executes the processing according to the read program, the same function as that of the service providing system is obtained.

A service providing program according to the present invention is a service providing program for associating service with a virtual object, for disposing the virtual object in a virtual space associated with an actual space, and for providing service corresponding to the virtual object according to a positional relationship between a movable mobile member and the virtual object, the program making a computer which is capable of using storage means for associating object information related to the virtual object with operation information specifying the content of an operation of the mobile member or another apparatus, and for storing them, execute processing in which, when it is determined according to the object information stored in the storage means that the positional relationship between the mobile member and the virtual object satisfies a predetermined condition, the mobile member or the another apparatus is operated according to the operation information corresponding to the virtual object, stored in the storage means.

With such a structure, when the computer reads the program and executes the processing according to the read program, the same function as that of the service providing system is obtained.

A service providing program according to the present invention is a service providing program for associating service with a virtual object, for disposing the virtual object in a virtual space associated with an actual space, and for providing service corresponding to the virtual object according to a positional relationship between a movable mobile member and the virtual object, the program making a computer which is capable of using storage means for associating object information related to the virtual object with service information specifying the content of service, and for storing them, execute processing in which, when it is determined according to the object information stored in the storage means that the positional relationship between the mobile member and the virtual object satisfies a predetermined condition, the service corresponding to the virtual object is provided according to the service information stored in the storage means, and processing implemented as input means for performing an input related to generation, deletion, or update of the object information, and object-information processing means for generating, deleting, or updating the object information according to the content of the input performed by the input means.

With such a structure, when the computer reads the program and executes the processing according to the read program, the same function as that of the service providing system is obtained.

A service providing method according to the present invention is a service providing method for associating service with a virtual object, for disposing the virtual object in a virtual space associated with an actual space, and for providing service corresponding to the virtual object according to a positional relationship between a movable mobile member and the virtual object, including the steps of associating object information related to the shape and location of the virtual object with service information specifying a service content and storing them; and obtaining location information used for identifying the location of the mobile member; and when it is determined according to the obtained location information and the stored object information that the mobile member is disposed in the inside area of the virtual object identified by the shape and location of the virtual object, providing service corresponding to the virtual object according to the stored service information.

With such a structure, the same function as that of the service providing system is obtained.

A service providing method according to the present invention is a service providing method for associating service with a virtual object, for disposing the virtual object in a virtual space associated with an actual space, and for providing service corresponding to the virtual object according to a positional relationship between a movable mobile member and the virtual object, including the steps of associating object information related to the virtual object with operation information specifying the content of an operation of the mobile member or another apparatus, and storing them; and when it is determined according to the stored object information that the positional relationship between the mobile member and the virtual object satisfies a predetermined condition, the mobile member or the another apparatus is operated according to the stored operation information corresponding to the virtual object.

With such a structure, the same function as that of the service providing system is obtained.

A service providing method according to the present invention is a service providing method for associating service with a virtual object, for disposing the virtual object in a virtual space associated with an actual space, and for providing service corresponding to the virtual object according to a positional relationship between a movable mobile member and the virtual object, including the steps of associating object information related to the virtual object with service information specifying the content of service, and storing them; and when it is determined according to the stored object information that the positional relationship between the mobile member and the virtual object satisfies a predetermined condition, providing the service corresponding to the virtual object according to the stored service information; and further including the steps of performing an input related to generation, deletion, or update of the object information; and generating, deleting, or updating the object information according to the content of the performed input.

With such a structure, the same function as that of the service providing system is obtained.

In the foregoing description, a service providing system, a management terminal, a mobile member, a service providing program, and a service providing method which achieve the foregoing object are provided. In addition to these things, first and second storage media, described below, can be provided to achieve the foregoing object.

The first storage medium is a computer-readable storage medium storing a program to be applied to the management terminal according to the present invention. When the location information is received, the program makes a computer having or being capable of using the storage means execute processing for determining according to the received location information and the object information stored in the storage means whether the mobile member is disposed in the inside area of the virtual object identified by the shape and location of the virtual object.

With such a structure, when the program stored in the storage medium is read by a computer and the computer executes the read program, a function having the same level and an advantage having the same level as the function and advantage obtained by the management terminal according to the present invention are obtained.

The second storage medium is a computer-readable storage medium storing a program to be applied to the mobile member according to the present invention. When the object information is received, the program makes a computer having or being capable of using the location-information acquisition means execute processing for determining according to the location information obtained by the location-information acquisition means and the received object information whether the mobile member is disposed in the inside area of the virtual object identified by the shape and location of the virtual object.

With such a structure, when the program stored in the storage medium is read by a computer and the computer executes the read program, a function having the same level and an advantage having the same level as the function and advantage obtained by the mobile member according to the present invention are obtained.

BRIEF DESCRIPTION OF THE DRAWINGS

FIG. 4 is a view showing a data structure in a virtual-object management table 400.

DETAILED DESCRIPTION OF PREFERRED EMBODIMENTS

Figure 1:
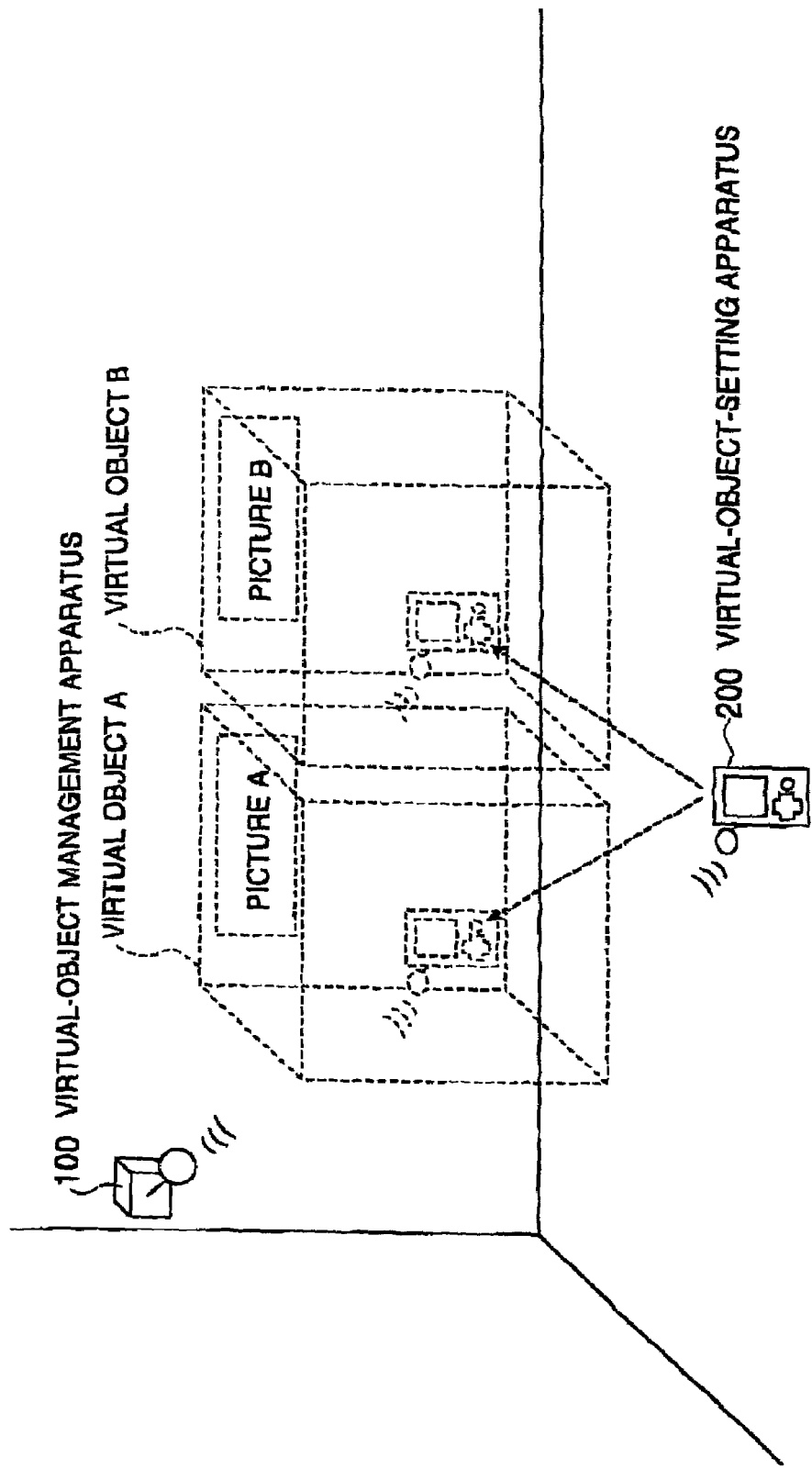
FIG. 1 is a view showing the structure of a network system to which the present invention is applied.

An embodiment of the present invention will be described below by referring to the drawings. FIG. 1 to FIG. 14 are views showing a service providing system, a management terminal, a mobile member, a service providing program, and a service providing method according to an embodiment of the present invention.

Figure 2:
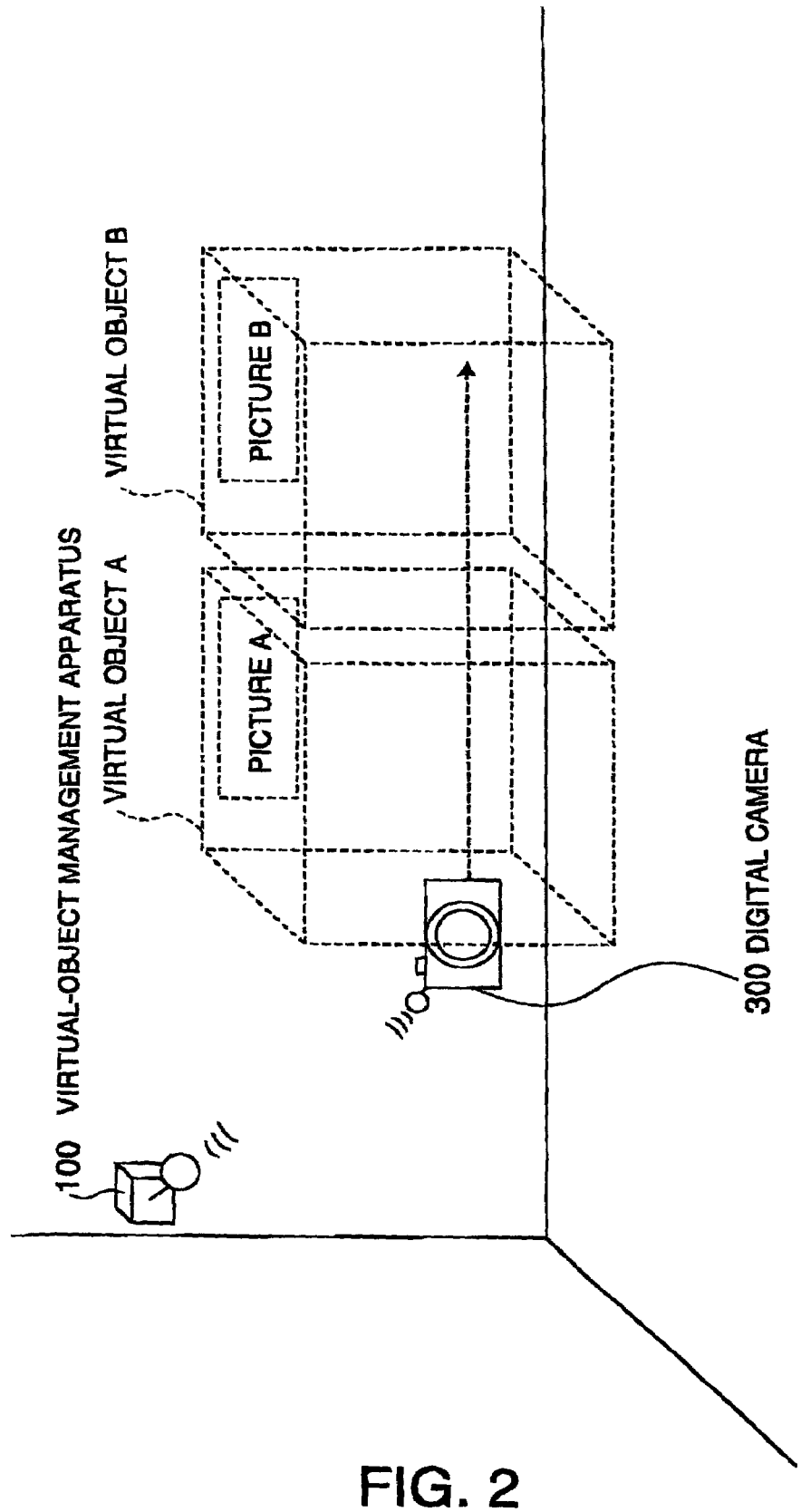
FIG. 2 is a view showing the structure of the network system to which the present invention is applied.

In the present embodiment, a service-providing system, a management terminal, a mobile member, a service providing program, and a service providing method according to the present invention are applied to a case in which in an art museum, as shown in FIG. 1 and FIG. 2, a virtual-object-setting apparatus 200 disposes and specifies cubic virtual objects A and B before pictures A and B exhibited on a wall surface, and capturing with a digital camera 300 is prohibited in the inside areas of the virtual objects A and B.

The structure of a network system to which the present invention is applied will be described first by referring to FIG. 1 and FIG. 2. FIG. 1 and FIG. 2 are views showing the structure of the network system to which the present invention is applied.

A virtual-object management apparatus 100 for managing virtual objects is placed, for example, as shown in FIG. 1, at an end of a wall surface in an art museum, and can bi-directionally communicate with the virtual-object-setting apparatus 200 for disposing and setting virtual objects, by radio communication. The virtual-object-setting apparatus 200 is formed of a personal digital assistant (PDA), and is used by a staff member of the art museum in the present embodiment.

The virtual-object management apparatus 100 can bi-directionally communicate by radio communication with the digital camera digital camera 300, which can capture images as digital data, as shown in FIG. 2. The digital camera 300 can be automatically set by internal processing such that capturing is enabled or disabled, and is used by a visitor to the art museum in the present embodiment.

Figure 3:
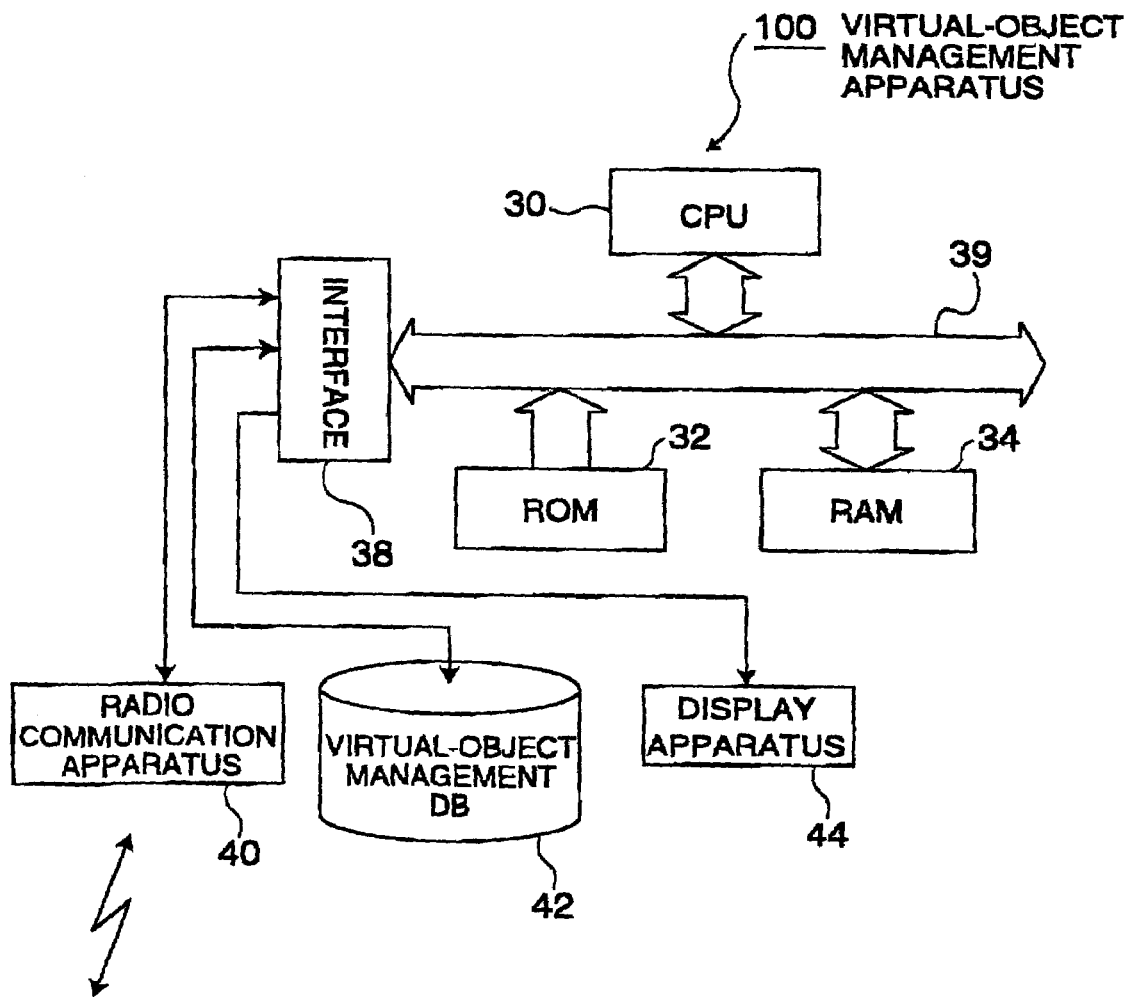
FIG. 3 is a block diagram showing the structure of a virtual-object management apparatus 100.

The structure of the virtual-object management apparatus 100 will be described next in detail by referring to FIG. 3. FIG. 3 is a block diagram showing the structure of the virtual-object management apparatus 100.

The virtual-object management apparatus 100 includes, as shown in FIG. 3, a CPU 30 for controlling calculations and the entire system according to a control program, a ROM 32 for storing the control program used by the CPU 30 in a predetermined area in advance, a RAM 34 for storing data read from the ROM 32 and calculation results necessary in a calculation process of the CPU 30, and an interface (I/F) 38 for sending and receiving data to and from external apparatuses. These components are connected to each other in a data transferable manner through a bus 39 which is a signal line for transferring data.

The interface (I/F) 38 is connected to external apparatuses; a radio communication apparatus 40 for communicating with the virtual-object-setting apparatus 200 and the digital camera 300 by radio communication, a virtual-object management data base (hereinafter, a data base is abbreviated as a DB) 42 for registering and managing object information related to virtual objects, and a display apparatus 44 for displaying a screen according to an image signal.

The virtual-object management DB 42 stores a virtual-object management table 400 in which object information related to the shapes and locations of virtual objects can be registered correspondingly to service information which specifies service contents, as shown in FIG. 4. FIG. 4 is a view showing the data structure of the virtual-object management table 400.

In the virtual-object management table 400, as shown in FIG. 4, one record can be registered for each virtual object. Each record includes a field 402 for registering a serial number, a field 404 for registering coordinates indicating the location of the virtual object in a virtual space corresponding to an actual space, a field 406 for registering the shape of the virtual object, a field 408 for registering the size of the virtual object, a field 410 for registering an action to be associated with the virtual object, and a field 412 for registering supplementary information for the virtual object. The data in the fields 404, 406, and 408 corresponds to object information, and the data in the fields 410 and 412 correspond to service information.

In the example shown in FIG. 4, at a first-row record, a serial number of "1" is input in the field 402, coordinates of "(10, 50, 20)" in the field 404, a size of "cube" is in the field 406, a size of "5 m" in the field 408, an action of "capturing prohibition" in the field 410, and a supplementary information of "Null" in the field 412. This record means that a cubic virtual object having a side length of 5 m is virtually disposed with coordinates (10, 50, 20) being assigned to its center, and capturing with the digital camera 300 is prohibited in the inside area of the virtual object identified by its location and shape.

A supplementary information of "Null" indicates that there is no supplementary information.

The CPU 30 is formed of a microprocessing unit MPU, activates a predetermined program stored at a predetermined area in the ROM 32, and executes in a time-division manner virtual-object generating processing, virtual-object deleting processing, virtual-object updating processing and object-information transmitting processing shown in flowcharts of FIG. 5 to FIG. 8, according to the program.

Figure 5:
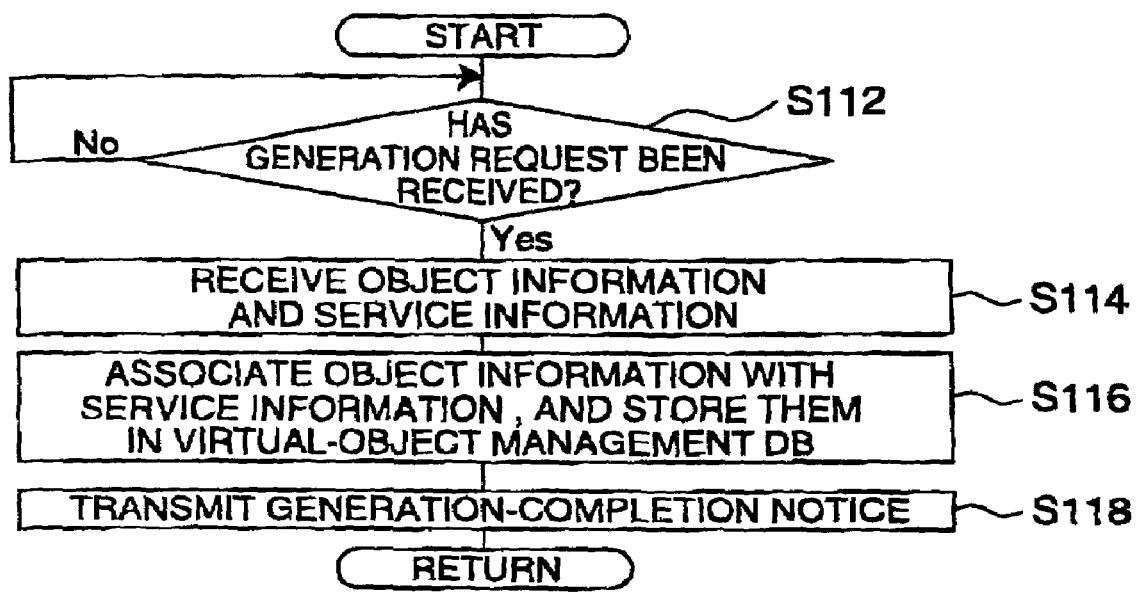
FIG. 5 is a flowchart of virtual-object generating processing.

The virtual-object generating processing will be described first in detail by referring to FIG. 5. FIG. 5 is a flowchart showing the virtual-object generating processing.

The virtual-object generating processing disposes and sets a virtual object according to a generation request sent from the virtual-object-setting apparatus 200. When the CPU 30 starts executing the processing, the processing proceeds to step S112 as shown in FIG. 5.

In step S112, it is determined whether a request for generating a virtual object has been received. When it is determined that a generation request has been received (Yes), the processing proceeds to step S114, and otherwise (No), the processing awaits in step S112 until a generation request is received.

In step S114, object information and service information are received. The processing proceeds to step S116, and the received object information is associated with the service information, and they are registered into the virtual-object management table 400. The processing proceeds to step S118, and a notice of completion of the generation of the virtual object is sent to the virtual-object-setting apparatus 200, a series of processes are terminated, and the processing returns to the original processing.

Figure 6:
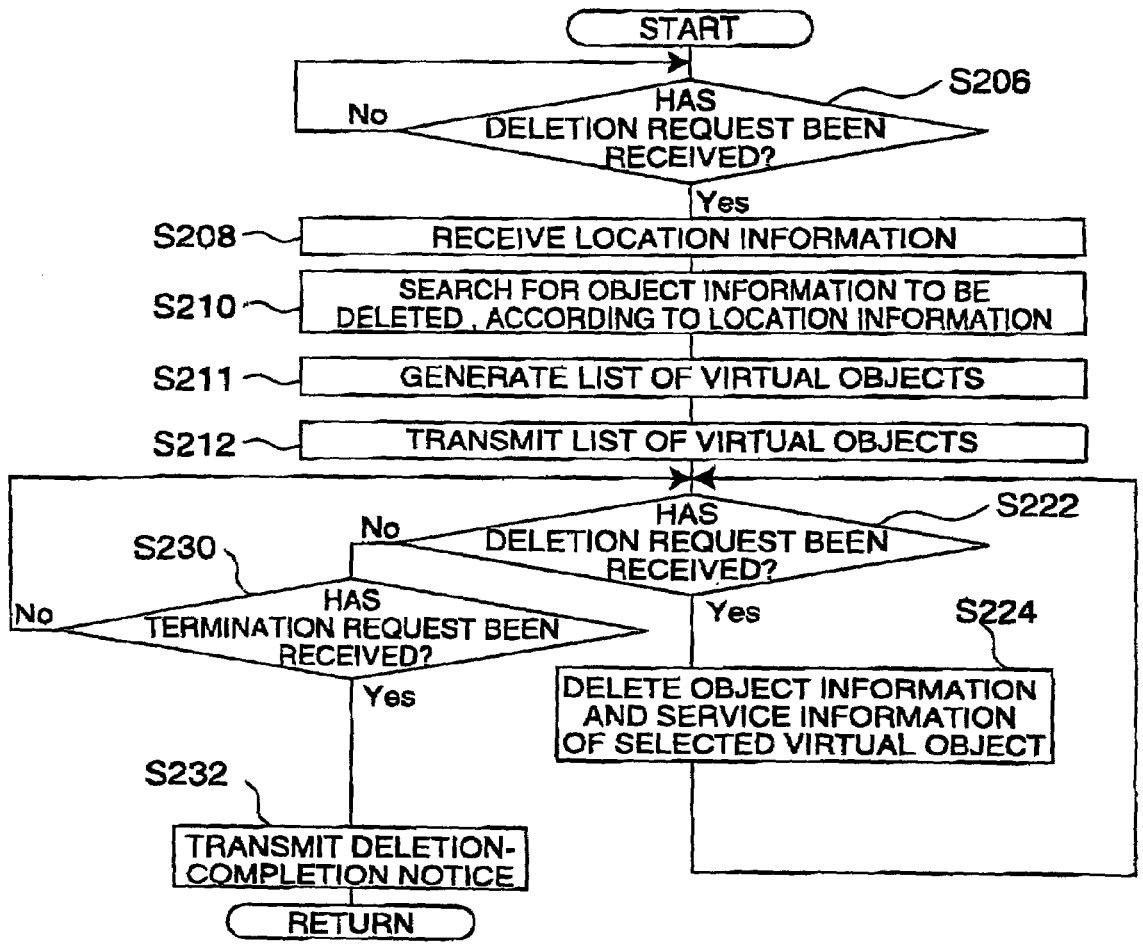
FIG. 6 is a flowchart of virtual-object deleting processing.

The virtual-object deleting processing will be described next in detail by referring to FIG. 6. FIG. 6 is a flowchart showing the virtual-object deleting processing.

The virtual-object deleting processing deletes a virtual object according to a deletion request sent from the virtual-object-setting apparatus 200. When the CPU 30 starts executing the processing, the processing proceeds to step S206, as shown in FIG. 6.

In step S206, it is determined whether a request for deleting a virtual object has been received. When it is determined that a deletion request has been received (Yes), the processing proceeds to step S208, and otherwise (No), the processing awaits in step S206 until a deletion request is received.

In step S208, location information is received. The processing proceeds to step S210, and the virtual-object management table 400 is searched according to the received location information for the corresponding object information. More specifically, in step S210, the object information of a virtual object(s) disposed within a predetermined distance (such as 10 m) from the location of the virtual-object-setting apparatus 200, specified by the location information is searched for. The virtual object(s) corresponding to the found object information is to be deleted.

In other words, the virtual-object-setting apparatus 200 needs to move into the inside area of the virtual object(s) to be deleted or close to the area in order to delete the virtual object.

Then, the processing proceeds to step S211, and a list of virtual objects to be deleted is generated according to the found object information. The processing proceeds to step S212, and the generated list of virtual objects is sent to the virtual-object-setting apparatus 200. The processing proceeds to step S222.

In step S222, it is determined whether a request for deleting virtual objects according to the list of virtual objects has been received. When it is determined that a deletion request has been received (Yes), the processing proceeds to step S224, the object information and the service information of the virtual objects to be deleted are deleted. The processing proceeds to step S222.

When it is determined in step S222 that a deletion request has not yet been received (No), the processing proceeds to step S230, and it is determined whether a termination request for terminating the deletion of virtual objects has been received. When it is determined that a termination request has been received (Yes), the processing proceeds to step S232, a notice of completion of the deletion of the virtual objects is sent to the virtual-object-setting apparatus 200, a series of processes is finished, and the processing returns to the original processing.

When it is determined in step S230 that a termination request has not yet been received (No), the processing proceeds to step S222.

Figure 7:
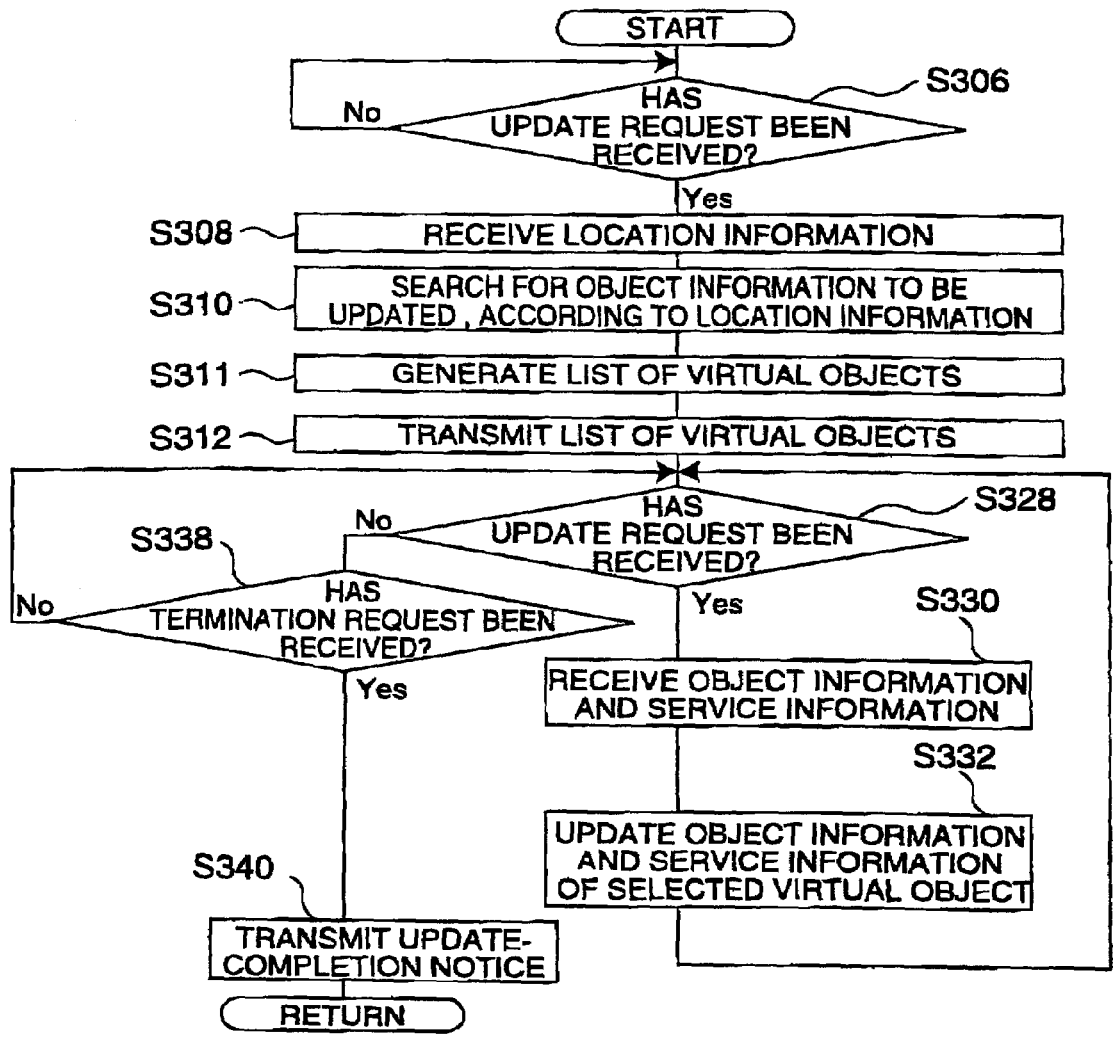
FIG. 7 is a flowchart of virtual-object updating processing.

The virtual-object updating processing will be described next in detail by referring to FIG. 7. FIG. 7 is a flowchart showing the virtual-object updating processing.

The virtual-object updating processing updates a virtual object according to an update request sent from the virtual-object-setting apparatus 200. When the CPU 30 starts executing the processing, the processing proceeds to step S306, as shown in FIG. 7.

In step S306, it is determined whether a request for updating a virtual object has been received. When it is determined that an update request has been received (Yes), the processing proceeds to step S308, and otherwise (No), the processing awaits at step S306 until an update request is received.

In step S308, location information is received. The processing proceeds to step S310, and the virtual-object management table 400 is searched according to the received location information for the corresponding object information. More specifically, in step S310, the object information of a virtual object(s) disposed within a predetermined distance from the location of the virtual-object-setting apparatus 200, specified by the location information is searched for. The virtual object(s) corresponding to the found object information is to be updated. In other words, the virtual-object-setting apparatus 200 needs to move into the inside area of the virtual object(s) to be updated or close to the area in order to update the virtual object.

Then, the processing proceeds to step S311, and a list of virtual objects to be updated is generated according to the found object information. The processing proceeds to step S312, and the generated list of virtual objects is sent to the virtual-object-setting apparatus 200. The processing proceeds to step S328.

In step S328, it is determined whether a request for updating virtual objects according to the list of virtual objects has been received. When it is determined that a update request has been received (Yes), the processing proceeds to step S330, and object information and service information are received. The processing proceeds to step S332, and the object information and the service information of virtual objects to be updated are updated according to the received object information and the received service information. The processing proceeds to step S328.

When it is determined in step S328 that an update request has not yet been received (No), the processing proceeds to step S338, and it is determined whether a termination request for terminating the update of virtual objects has been received. When it is determined that a termination request has been received (Yes), the processing proceeds to step S340, a notice of completion of the update of the virtual objects is sent to the virtual-object-setting apparatus 200, a series of processes is finished, and the processing returns to the original processing.

When it is determined in step S338 that a termination request has not yet been received (No), the processing proceeds to step S328.

Figure 8:
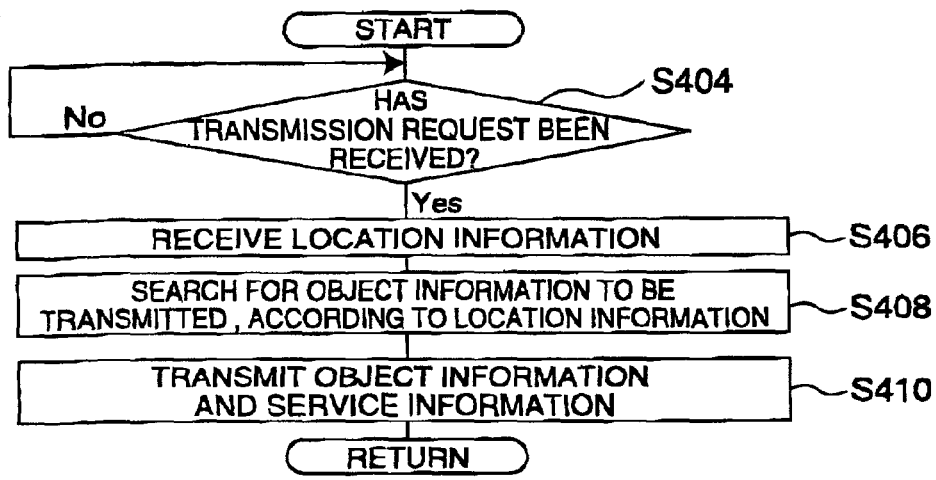
FIG. 8 is a flowchart of object-information transmitting processing.

The object-information transmitting processing will be described next in detail by referring to FIG. 8. FIG. 8 is a flowchart showing the object-information transmitting processing.

The object-information transmitting processing transmits object information stored in the virtual-object management DB 42 according to a transmission request sent from the digital camera 300. When the CPU 30 starts executing the processing, the processing proceeds to step S404, as shown in FIG. 8.

In step S404, it is determined whether a request for transmitting object information has been received. When it is determined that a transmission request has been received (Yes), the processing proceeds to step S406, and otherwise (No), the processing awaits at step S404 until a transmission request is received.

In step S406, location information is received. The processing proceeds to step S408, and the virtual-object management table 400 is searched according to the received location information for the corresponding object information. More specifically, in step S408, the object information of a virtual object(s) disposed within a predetermined distance from the location of the virtual-object-setting apparatus 200, specified by the location information is searched for. The found object information is to be transmitted.

Then, the processing proceeds to step S410, the found object information and the service information corresponding thereto are transmitted to the digital camera 300, a series of processes is finished, and the processing returns to the original processing.

Figure 9:
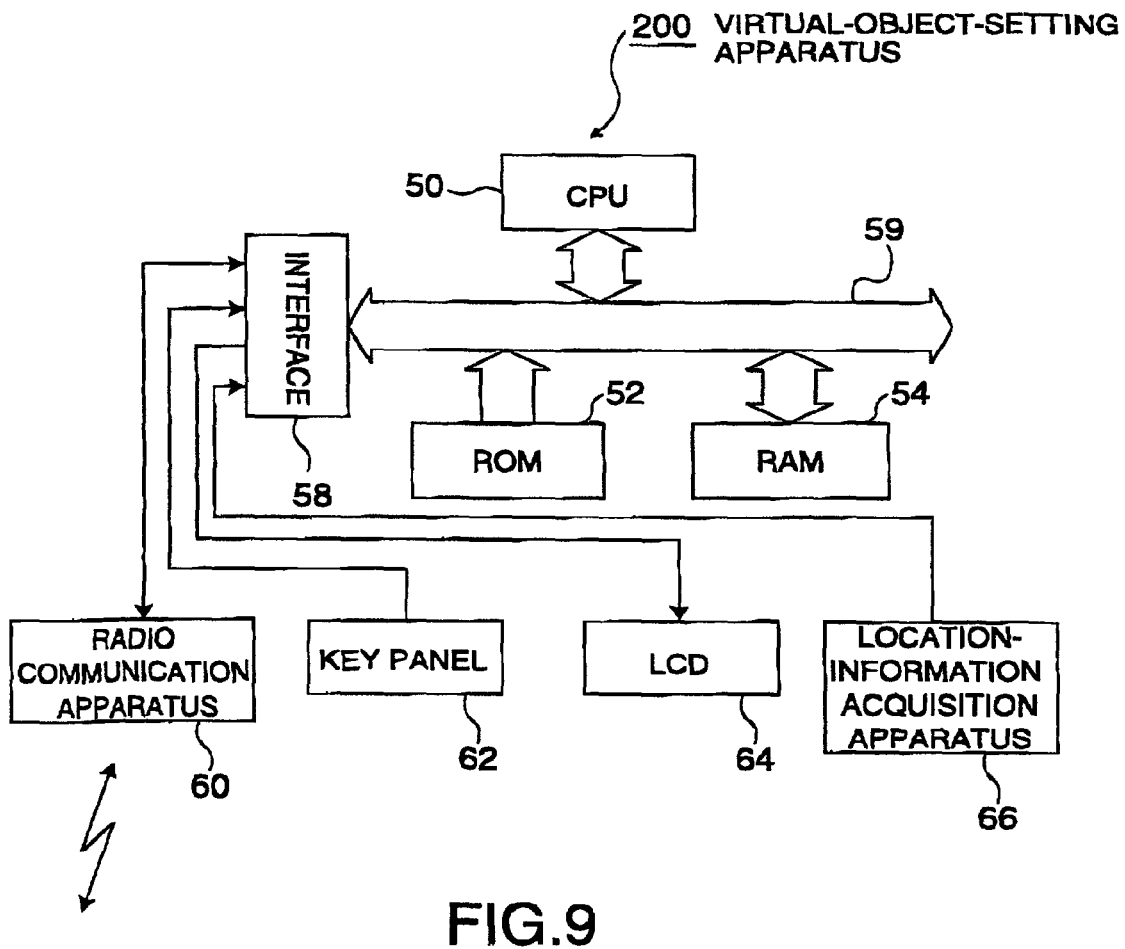
FIG. 9 is a block diagram showing the structure of a virtual-object-setting apparatus 200.

The structure of the virtual-object-setting apparatus 200 will be described in detail by referring to FIG. 9. FIG. 9 is a block diagram showing the structure of the virtual-object-setting apparatus 200.

The virtual-object-setting apparatus 200 includes, as shown in FIG. 9, a CPU 50 for controlling calculations and the entire system according to a control program, a ROM 52 for storing the control program used by the CPU 50 in a predetermined area in advance, a RAM 54 for storing data read from the ROM 52 and calculation results necessary in a calculation process of the CPU 50, and an interface (I/F) 58 for sending and receiving data to and from external apparatuses. These components are connected to each other in a data transferable manner through a bus 59 which is a signal line for transferring data.

The interface (I/F) 58 is connected to external apparatuses; a radio communication apparatus 60 for communicating with the virtual-object management apparatus 100 by radio communication, a key panel 62 serving as a human interface for allowing data to be input by a plurality of keys, a liquid-crystal display (LCD) 64 for displaying a screen according to an image signal, and a location-information acquisition apparatus 66 for measuring the current location of the virtual-object-setting apparatus 200 to obtain location information identifying the location.

The location-information acquisition apparatus 66 receives from non-geostationary satellites for sending time signals indicating the current time the time signals, measures the location of the current point by using a so-called GPS for measuring a location according to the differences between the times indicated by the time signals and the orbits of the non-geostationary satellites, and outputs the measured location of the current point as location information.

Figure 10:
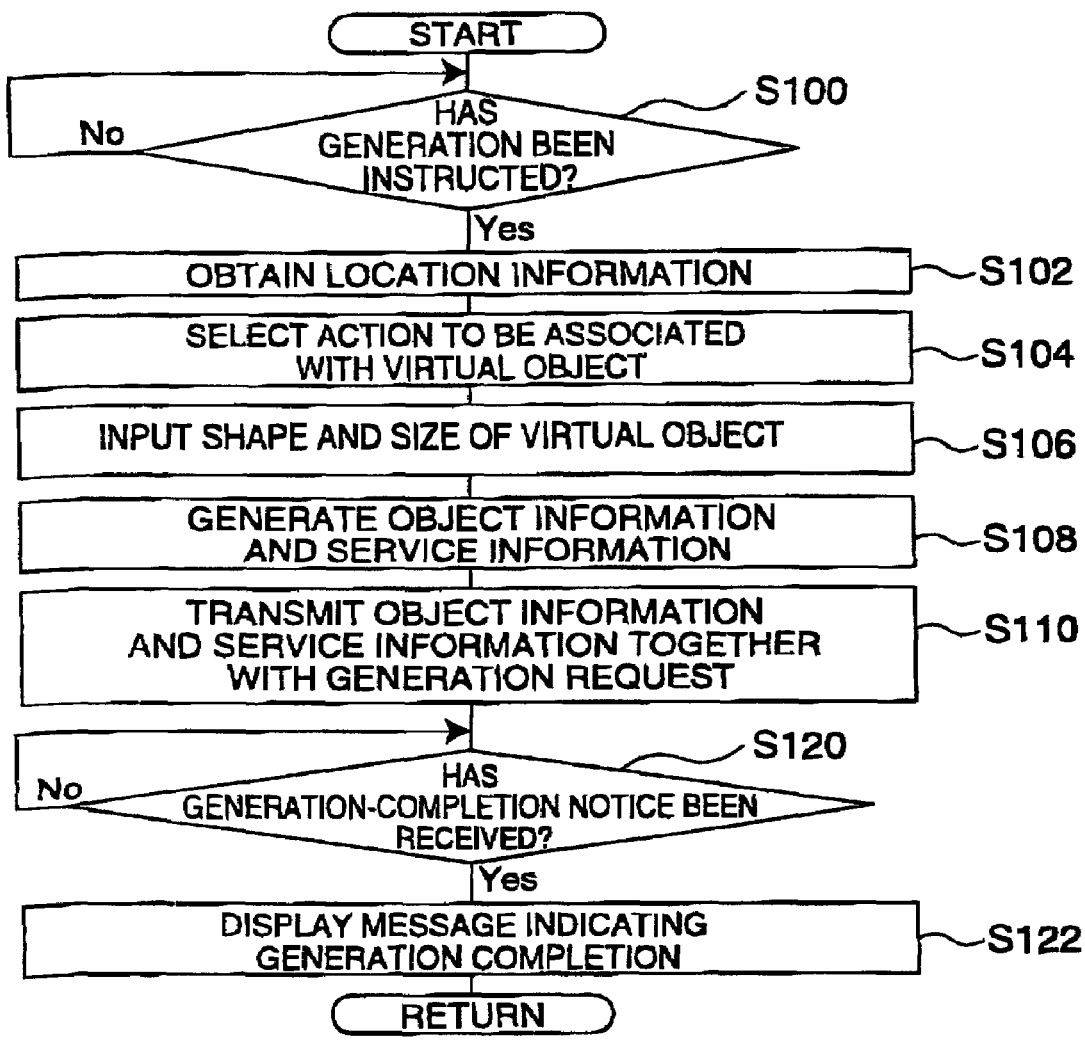
FIG. 10 is a flowchart of virtual-object-generation request processing.
Figure 11:
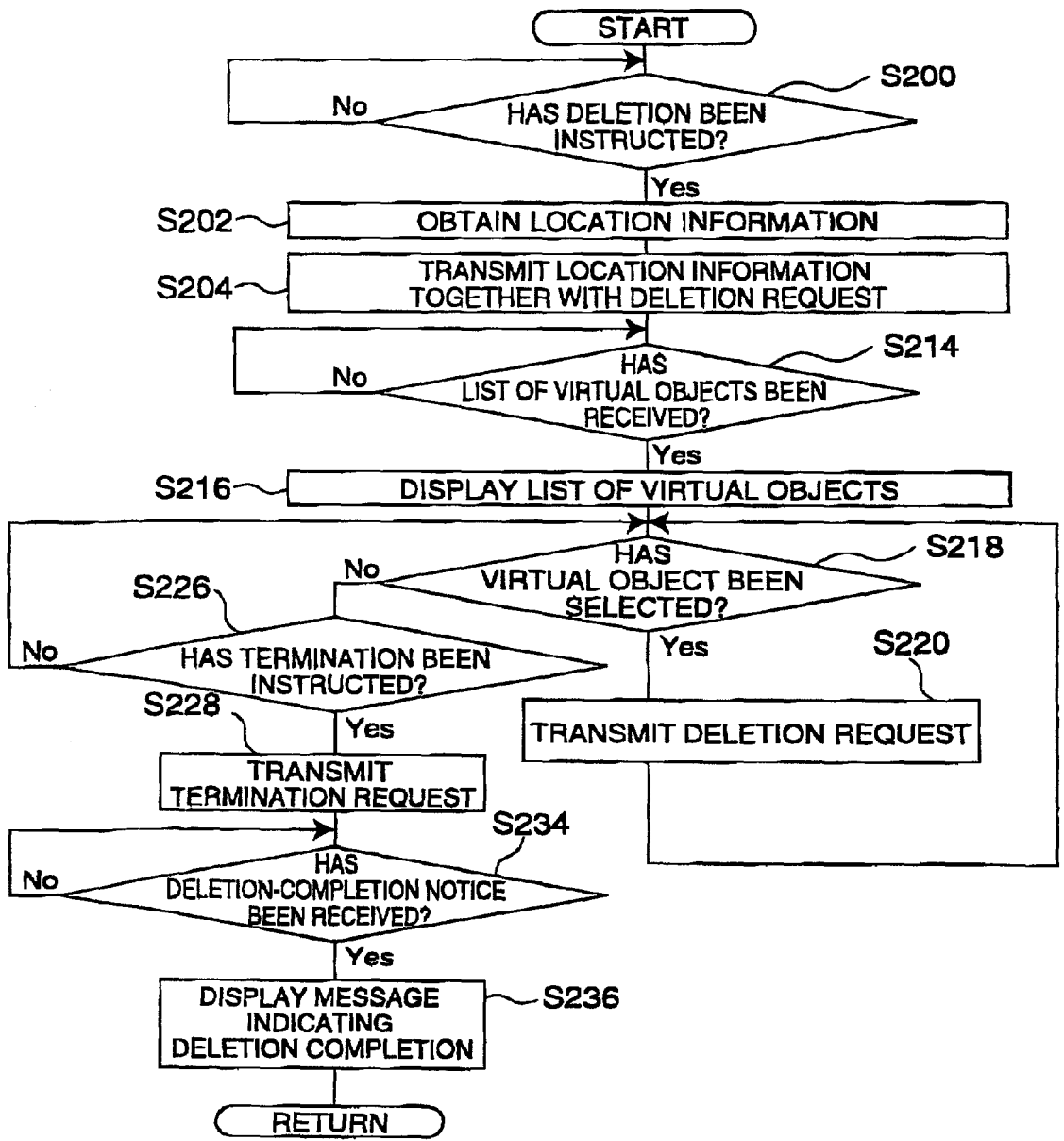
FIG. 11 is a flowchart of virtual-object-deletion request processing.
Figure 12:
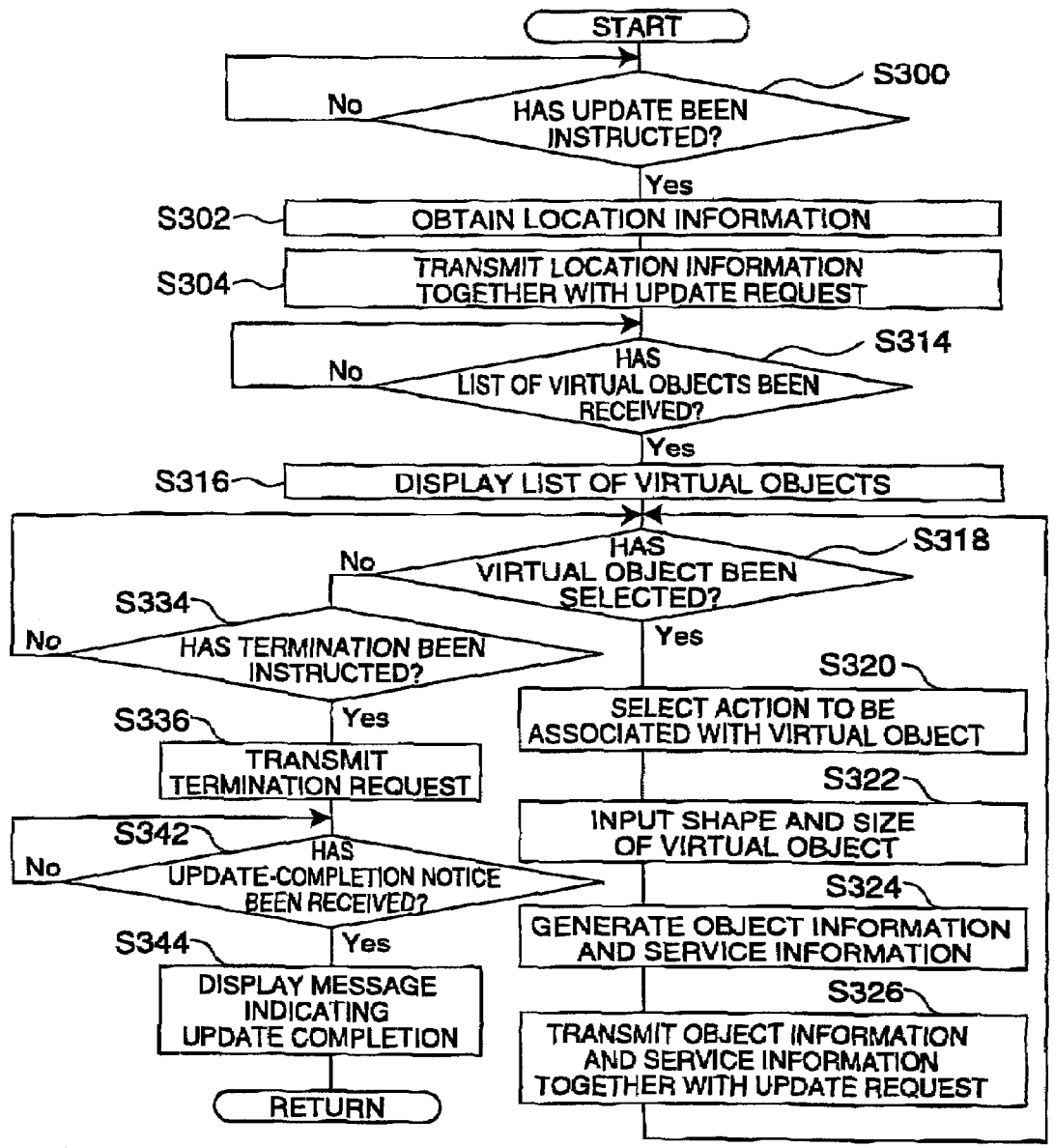
FIG. 12 is a flowchart of virtual-object-update request processing.

The CPU 50 is formed of a microprocessing unit MPU, activates a predetermined program stored at a predetermined area in the ROM 52, and executes in a time-division manner virtual-object-generation request processing, virtual-object-deletion request processing, and virtual-object-update request processing shown in flowcharts of FIG. 10 to FIG. 12, according to the program.

The virtual-object-generation request processing will be described first in detail by referring to FIG. 10. FIG. 10 is a flowchart showing the virtual-object-generation request processing.

The virtual-object-generation request processing corresponds to the virtual-object generating processing shown in FIG. 5, requests the virtual-object management apparatus 100 to generate a virtual object. When the CPU 50 starts executing the processing, the processing proceeds to step S100 as shown in FIG. 10.

In step S100, it is determined whether the user of the virtual-object-setting apparatus 200 has instructed the generation of a virtual object. When it is determined that the generation of a virtual object has been instructed (Yes), the processing proceeds to step S102, and otherwise (No), the processing awaits in step S100 until the generation of a virtual object is instructed.

In step S102, location information is obtained from the location-information acquisition apparatus 66. The processing proceeds to step S104, and an action to be associated with the virtual object is selected from among a plurality of actions through the key panel 62. Actions which can be selected include an action for prohibiting capturing and an action for indicating a description.

Then, the processing proceeds to step S106, and the shape and size of the virtual object are input from the key panel 62. The processing proceeds to step S108, and object information and service information are generated according to the obtained location information and the selection result and the input result of steps S104 and S106. The processing proceeds to step S110, and a request for generating the virtual object is sent together with the generated object information and the generated service information to the virtual-object management apparatus 100. The processing proceeds to step S120.

In step S120, it is determined whether a notice of completion of the generation of the virtual object has been received. When it is determined that a generation-completion notice has been received (Yes), the processing proceeds to step S122, a message indicating that the generation of the virtual object has been completed is shown in the LCD 64, a series of processes are terminated, and the processing returns to the original processing.

On the other hand, when it is determined in step S120 that a generation completion notice has not yet been received (No), the processing awaits in step S120 until a generation completion notice is received.

The virtual-object-deletion request processing will be described next in detail by referring to FIG. 1. FIG. 11 is a flowchart showing the virtual-object-deletion request processing.

The virtual-object-deletion request processing corresponds to the virtual-object deleting processing shown in FIG. 6, requests the virtual-object management apparatus 100 to delete a virtual object. When the CPU 50 starts executing the processing, the processing proceeds to step S200 as shown in FIG. 11.

In step S200, it is determined whether the user has instructed the deletion of a virtual object. When it is determined that the deletion of a virtual object has been instructed (Yes), the processing proceeds to step S202, and otherwise (No), the processing awaits in step S200 until the deletion of a virtual object is instructed.

In step S202, location information is obtained from the location-information acquisition apparatus 66. The processing proceeds to step S204, and a request for deleting the virtual object is sent together with the obtained location information to the virtual-object management apparatus 100. The processing proceeds to step S214.

In step S214, it is determined whether a list of virtual objects has been received. When it is determined that a list of virtual objects has been received (Yes), the processing proceeds to step S216, and the received list of virtual objects is displayed on the LCD 64. The processing proceeds to step S218.

In step S218, it is determined whether a virtual object to be deleted has been selected from the list of virtual objects. When it is determined that a virtual object to be deleted has been selected from the list (Yes), the processing proceeds to step S220, and a request for deleting the virtual object according to the list of virtual objects is sent to the virtual-object management apparatus 100. The processing proceeds to step S218.

On the other hand, in step S218, when it is determined that a virtual object has not yet been selected (No), the processing proceeds to step S226, and it is determined whether the user has instructed a deletion termination of a virtual object. When it is determined that a deletion termination of a virtual object has been instructed (Yes), the processing proceeds to step S228, and a termination request for terminating the deletion of a virtual object is sent to the virtual-object management apparatus 100. The processing proceeds to step S234.

In step S234, it is determined whether a notice of completion of the deletion of the virtual object has been received. When it is determined that a deletion-completion notice has been received (Yes), the processing proceeds to step S236, a message indicating that the deletion of the virtual object has been completed is shown in the LCD 64, a series of processes are terminated, and the processing returns to the original processing.

On the other hand, when it is determined in step S234 that a deletion-completion notice has not yet been received (No), the processing awaits in step S234 until a deletion-completion notice is received.

On the other hand, in step S226, when it is determined that a deletion termination of a virtual object has not yet been instructed (No), the processing proceeds to step S218.

On the other hand, when it is determined in step S214 that the list of virtual objects has not yet been received (Yes), the processing awaits in step S214 until the list of virtual objects is received.

The virtual-object-update request processing will be described next in detail by referring to FIG. 12. FIG. 12 is a flowchart showing the virtual-object-update request processing.

The virtual-object-update request processing corresponds to the virtual-object updating processing shown in FIG. 7, requests the virtual-object management apparatus 100 to update a virtual object. When the CPU 50 starts executing the processing, the processing proceeds to step S300 as shown in FIG. 12

In step S300, it is determined whether the user has instructed the update of a virtual object. When it is determined that the update of a virtual object has been instructed (Yes), the processing proceeds to step S302, and otherwise (No), the processing awaits in step S300 until the update of a virtual object is instructed.

In step S302, location information is obtained from the location-information acquisition apparatus 66. The processing proceeds to step S304, and a request for updating the virtual object is sent together with the obtained location information to the virtual-object management apparatus 100. The processing proceeds to step S314.

In step S314, it is determined whether a list of virtual objects has been received. When it is determined that a list of virtual objects has been received (Yes), the processing proceeds to step S316, and the received list of virtual objects is displayed on the LCD 64. The processing proceeds to step S318.

In step S318, it is determined whether a virtual object to be updated has been selected from the list of virtual objects. When it is determined that a virtual object to be updated has been selected from the list (Yes), the processing proceeds to step S320, and an action to be associated with the virtual object is selected from a plurality of actions. The processing proceeds to step S322, and the shape and size of the virtual object are input from the key panel 62. The processing proceeds to step S324, and object information and service information are generated according to the obtained location information and the selection result and the input result of step S320 and step S322. The processing proceeds to step S326, the generated object information and the generated service information are sent together with a request for updating the virtual object according to the list of virtual objects to the virtual-object management apparatus 100. The processing proceeds to step S318.

On the other hand, in step S318, when it is determined that a virtual object has not yet been selected (No), the processing proceeds to step S334, and it is determined whether the user has instructed an update termination of a virtual object. When it is determined that an update termination of a virtual object has been instructed (Yes), the processing proceeds to step S336, and a termination request for terminating the update of a virtual object is sent to the virtual-object management apparatus 100. The processing proceeds to step S342.

In step S342, it is determined whether a notice of completion of the update of the virtual object has been received. When it is determined that an update-completion notice has been received (Yes), the processing proceeds to step S344, a message indicating that the update of the virtual object has been completed is shown in the LCD 64, a series of processes are terminated, and the processing returns to the original processing.

On the other hand, when it is determined in step S342 that an update-completion notice has not yet been received (No), the processing awaits in step S342 until an update-completion notice is received.

On the other hand, in step S334, when it is determined that an update termination of a virtual object has not yet been instructed (No), the processing proceeds to step S318.

On the other hand, when it is determined in step S314 that the list of virtual objects has not yet been received (Yes), the processing awaits in step S314 until the list of virtual objects is received.

Figure 13:
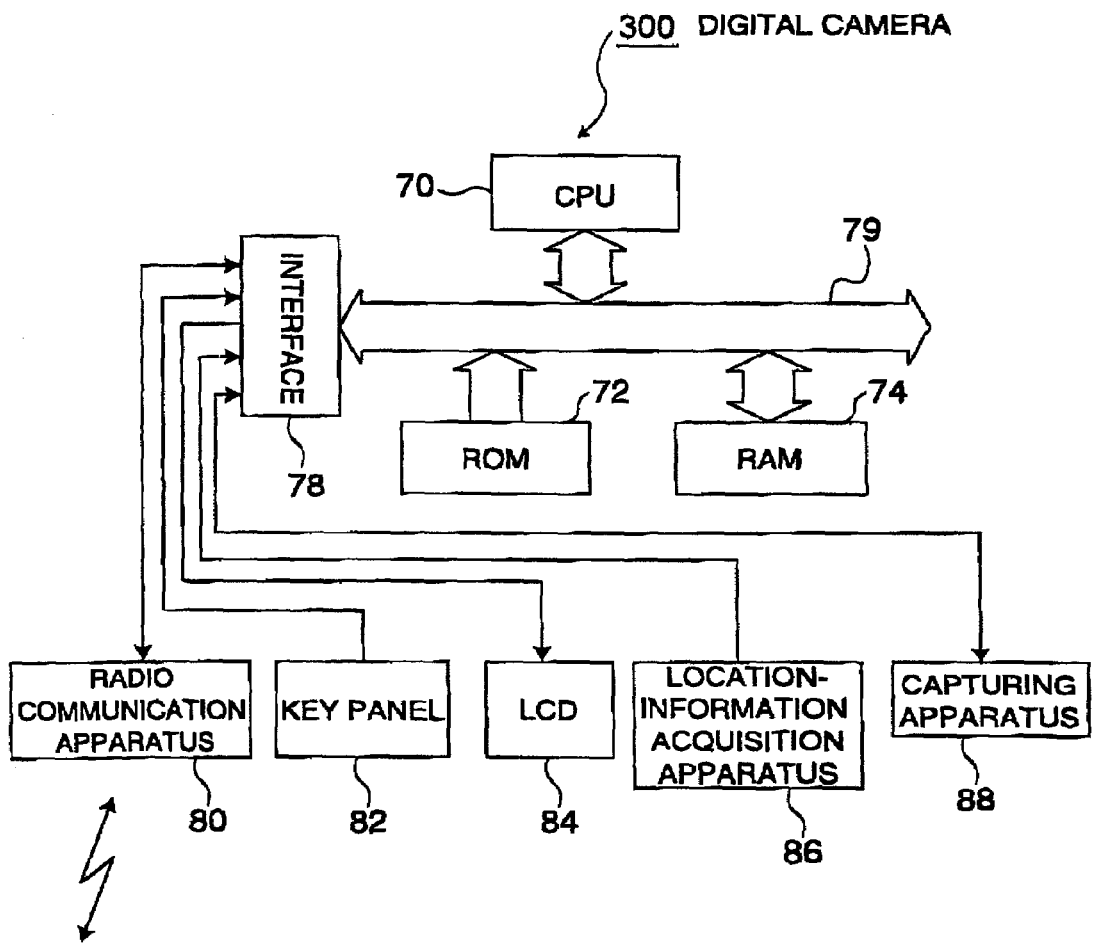
FIG. 13 is a block diagram showing the structure of a digital camera 300.

The structure of the digital camera 300 will be described next in detail by referring to FIG. 13. FIG. 13 is a block diagram showing the structure of the digital camera 300.

The digital camera 300 includes, as shown in FIG. 13, a CPU 70 for controlling calculations and the entire system according to a control program, a ROM 72 for storing the control program used by the CPU 70 in a predetermined area in advance, a RAM 74 for storing data read from the ROM 72 and calculation results necessary in a calculation process of the CPU 70, and an interface (I/F) 78 for sending and receiving data to and from external apparatuses. These components are connected to each other in a data transferable manner through a bus 79 which is a signal line for transferring data.

The interface (I/F) 78 is connected to external apparatuses; a radio communication apparatus 80 for communicating with the virtual-object management apparatus 100 by radio communication, a key panel 82 serving as a human interface for allowing data to be input by a plurality of keys, a liquid-crystal display (LCD) 84 for displaying a screen according to an image signal, a location-information acquisition apparatus 86 for measuring the current location of the digital camera 300 to obtain location information identifying the location, and a capturing apparatus 88 for capturing images as digital data.

Figure 14:
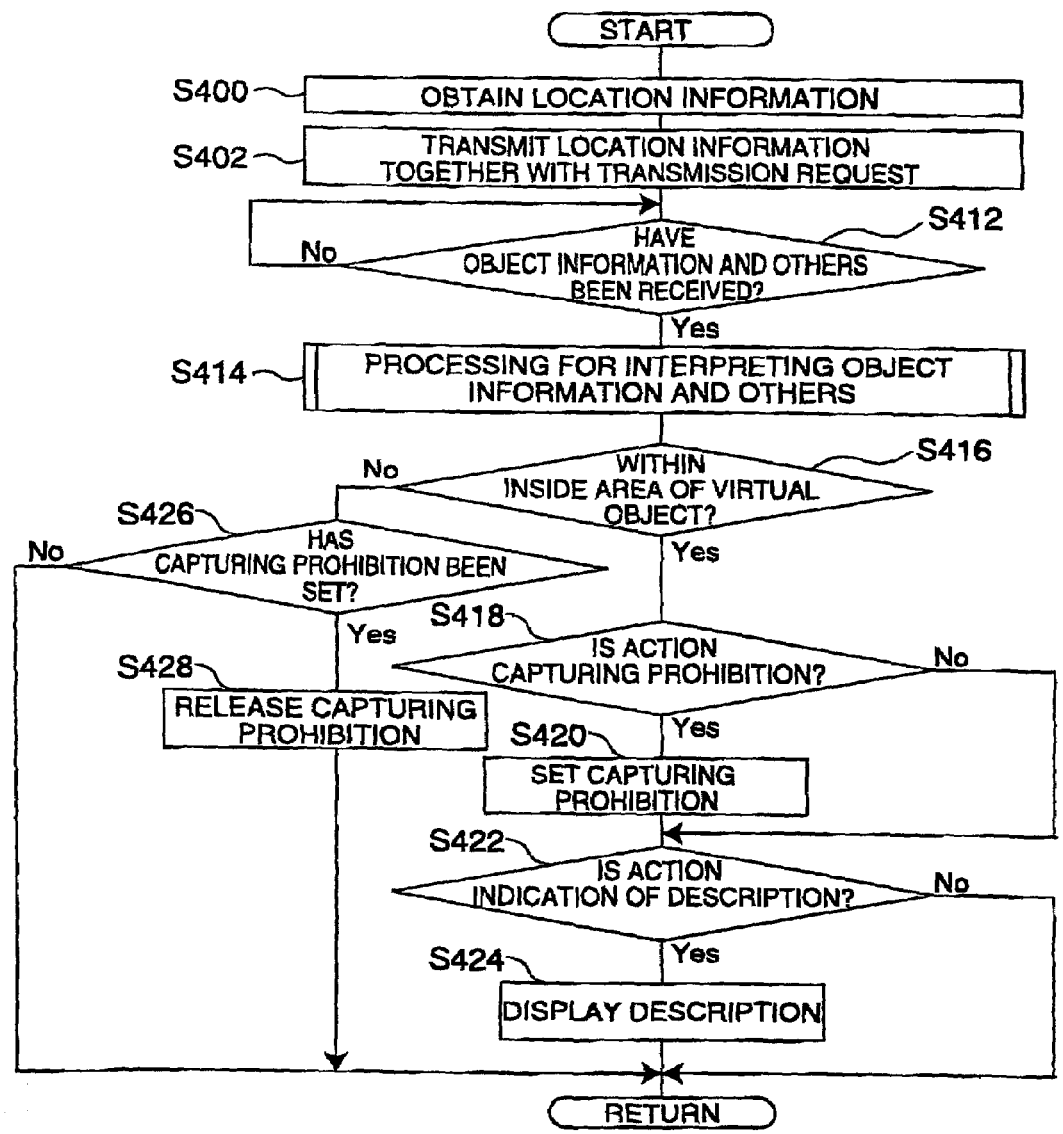
FIG. 14 is a flowchart of object-information-transmission request processing.

The CPU 70 is formed of a microprocessing unit MPU, activates a predetermined program stored at a predetermined area in the ROM 72, and executes object-information-transmission request processing shown in a flowchart of FIG. 14, according to the program. FIG. 14 is a flowchart showing the object-information-transmission request processing.

The object-information-transmission request processing corresponds to the object-information transmitting processing shown in FIG. 8, and requests the virtual-object management apparatus 100 to send object information and service information. When the CPU 70 starts executing the processing, the processing proceeds to step S400 as shown in FIG. 14.

In step S400, location information is obtained from the location-information acquisition apparatus 86. The processing proceeds to step S402, and the obtained location information is sent together with a request for transmitting object information to the virtual-object management apparatus 100. The processing proceeds to step S412.

In step S412, it is determined whether object information and service information have been received. When it is determined that object information and service information have been received (Yes), the processing proceeds to step S414, and interpretation processing for interpreting the received object information and the received service information is executed. The request processing proceeds to step S416.

In step S416, it is determined according to the interpretation result of step S414 whether the digital camera 300 is disposed in the inside area of the virtual object. When it is determined that the digital camera 300 is disposed in the inside area of the virtual object (Yes), the processing proceeds to step S418, and it is determined whether an action associated with the virtual object is capturing prohibition. When it is determined that the action is capturing prohibition (Yes), the processing proceeds to step S420, and capturing with the capturing apparatus 88 is made prohibited. The processing proceeds to step S422.

In step S422, it is determined whether the action associated with the virtual object is the indication of a description. When it is determined that the action is the indication of a description (Yes), the processing proceeds to step S424, supplementary information included in the service information is displayed on the LCD 84, a series of processes is terminated, and the processing proceeds to the original processing.

On the other hand, in step S422, when it is determined that the action associated with the virtual object is not the indication of a description (No), the series of processes is terminated, and the processing proceeds to the original processing.

On the other hand, in step S418, when it is determined that the action associated with the virtual object is not capturing prohibition (No), the processing proceeds to step S422.

On the other hand, in step S416, it is determined that the digital camera 300 is not disposed in the inside area of the virtual object (No), the processing proceeds to step S426, and it is determined whether capturing has been prohibited. When it is determined that capturing has been prohibited (Yes), the processing proceeds to step S428, the prohibition of capturing is released, the series of processes is terminated, and the processing proceeds to the original processing.

On the other hand, in step S426, when it is determined that the prohibition of capturing has not been set (No), the series of processes is terminated, and the processing proceeds to the original processing.

On the other hand, in step S412, when it is determined that object information and service information have not been received (No), the processing awaits in step S412 until object information and service information are received.

Operations in the above-described embodiment will be described next.

A case in which a virtual object is generated will be described first.

A stuff member of the art museum uses the virtual-object-setting apparatus 200 to generate a virtual object. The stuff member first instructs the virtual-object-setting apparatus 200 to generate a virtual object.

When the user instructs the generation of a virtual object, the virtual-object-setting apparatus 200 obtains location information from the location-information acquisition apparatus 66 and requests the user to select an action to be associated with the virtual object through step S102 and step S104. In response to the selection request, the user selects an action to be associated with the virtual object from a plurality of actions. In this case, since the stuff member of the art museum wants to prohibit capturing of the pictures A and B, the stuff member selects the prohibition of capturing as an action to be associated with the virtual object.

When the action is selected, the virtual-object-setting apparatus 200 requests the user to input the shape and size of the virtual object through step S106. In response to the input request, the user inputs the shape and size of the virtual object.

In this case, since the stuff member of the art museum wants to prohibit capturing of the pictures A and B, the stuff member inputs a cubic shape which includes a viewing area and an appropriate size. In the example shown in FIG. 1, cubic virtual objects A and B are specified in front of the pictures A and B, respectively.

When the shape and size of the virtual object are input, the virtual-object-setting apparatus 200 generates object information and service information according to the obtained location information and the selection result and the input result of step S104 and step S106, and sends a generation request together with the generated object information and the generated service information to the virtual-object management apparatus 100 through step S108 and step S110.

When the virtual-object management apparatus 100 receives the generation request, it receives the object information and the service information, associates the object information with the service information and stores them in the virtual-object management table 400, and sends a notice of completion of the generation of the virtual object to the virtual-object-setting apparatus 200 through step S114 to step S118.

When the virtual-object-setting apparatus 200 receives the generation-completion notice, it displays a message indicating that the generation of the virtual object has been completed through step S122.

A case in which an attempt is made by a viewer having the digital camera 300 to capture the pictures A and B near them will be described next.

When the viewer having the digital camera 300 comes close to the pictures A and B in a condition in which the virtual objects A and B have been specified as described above, the digital camera 300 obtains location information from the location-information acquisition apparatus 86, and sends a transmission request together with the obtained location information to the virtual-object management apparatus virtual-object management apparatus 100 through steps S400 and S402.

When the virtual-object management apparatus 100 receives the transmission request, it receives the location information, and searches the virtual-object management table 400 according to the received location information for the corresponding object information through step S406 and step S408. In this case, the object information of the virtual objects A and B are found.

The virtual-object management apparatus 100 sends the found object information and the service information corresponding thereto to the digital camera 300 through step S410.

When the digital camera 300 receives the object information and the service information, it interprets the received object information and the received service information, and determines according to the interpretation result that the digital camera 300 is disposed in the inside area of the virtual object, through step S414 and step S416. In this case, since the viewer is located close to the pictures A and B, the digital camera 300 is disposed in the inside area of a virtual object. Therefore, through steps S418 and S420, the prohibition of capturing by the use of the capturing apparatus 88 is specified.

Consequently, in this state, the viewer cannot capture the pictures A and B by the use of the digital camera 300.

When the viewer moves away from the inside areas of the virtual objects A and B, the digital camera 300 receives object information and service information. Since it is determined that the digital camera 300 is not disposed in the inside areas of the virtual objects, the prohibition of capturing is released through steps S416, S426, and S428.

In the above example, an action of the prohibition of capturing has been associated with the virtual objects. When an action of the indication of a description is associated, for example, the digital camera 300 performs the same processes up to step S416, and then, indicates descriptions of the pictures A and B through steps S422 and S424.

A case in which a virtual object is deleted will be described next.

A stuff member of the art museum uses the virtual-object-setting apparatus 200 to delete a virtual object. The stuff member first moves to a place where the virtual objects A and B have been specified, and instructs the virtual-object-setting apparatus 200 to delete the virtual objects.

When the virtual-object-setting apparatus 200 receives a user instruction of the deletion of the virtual objects, it receives location information from the location-information acquisition apparatus 66, and sends a deletion request together with the obtained location information to the virtual-object management apparatus 100 through steps S202 and S204.

When the virtual-object management apparatus 100 receives the deletion request, it receives the location information, and searches the virtual-object management table 400 according to the received location information for the corresponding object information through steps S208 and S210. In this case, the object information of the virtual objects A and B is found.

Then, a list of virtual objects to be deleted is generated according to the found object information, and the generated list of virtual objects is sent to the virtual-object-setting apparatus 200 through steps S211 and S212.

When the virtual-object-setting apparatus 200 receives the list of virtual objects, it displays the received list of virtual objects through step S216, and requests the user to select a virtual object to be deleted. In response to the selection request, the user selects, for example, the virtual object A.

When the object to be deleted is selected, the virtual-object-setting apparatus 200 sends a deletion request and a deletion object of the virtual object A to the virtual-object management apparatus 100 through step S220.

When the virtual-object management apparatus 100 receives a deletion object of the virtual object A and the deletion request, it deletes the object information and the service information of the virtual object selected as an object to be deleted, through step S224. When the virtual-object management apparatus 100 receives a termination request from the virtual-object-setting apparatus 200, it sends a deletion-completion notice to the virtual-object-setting apparatus 200.

When the virtual-object-setting apparatus 200 receives the deletion-completion notice, it displays a message indicating that the virtual object has been deleted, through step S236.

A case in which a virtual object is updated will be described next.

A stuff member of the art museum uses the virtual-object-setting apparatus 200 to update a virtual object. The stuff member first moves to a place where the virtual objects A and B have been specified, and instructs the virtual-object-setting apparatus 200 to update the virtual objects.

When the virtual-object-setting apparatus 200 receives a user instruction of the update of the virtual objects, it receives location information from the location-information acquisition apparatus 66, and sends an update request together with the obtained location information to the virtual-object management apparatus 100 through steps S302 and S304.

When the virtual-object management apparatus 100 receives the update request, it receives the location information, and searches the virtual-object management table 400 according to the received location information for the corresponding object information through steps S308 and S310. In this case, the object information of the virtual objects A and B is found.

Then, a list of virtual objects to be updated is generated according to the found object information, and the generated list of virtual objects is sent to the virtual-object-setting apparatus 200 through steps S311 and S312.

When the virtual-object-setting apparatus 200 receives the list of virtual objects, it displays the received list of virtual objects through step S316, and requests the user to select a virtual object to be updated. In response to the selection request, the user selects, for example, the virtual object B as an object to be updated, and inputs an update content for the virtual object B, selected.

When the object to be updated is selected and the update content is input, the virtual-object-setting apparatus 200 generates object information and service information according to the obtained location information, and the selection result and the input result of steps S320 and S322, and sends the generated object information and the generated service information to the virtual-object management apparatus 100 together with an update object of the virtual object B and a update request, through steps S324 and S326.

When the virtual-object management apparatus 100 receives an update object of the virtual object B and the update request, it receives the object information and the service information, and updates the object information and the service information of the virtual object selected as an object to be updated, according to the received object information and the received service information, through steps S330 and S332. Then, when the virtual-object management apparatus 100 receives a termination request from the virtual-object-setting apparatus 200, it sends an update-completion notice to the virtual-object-setting apparatus 200 through step S340.

When the virtual-object-setting apparatus 200 receives the update-completion notice, it displays a message indicating that the virtual object has been updated, through the step S344.

As described above, in the present embodiment, the virtual-object management apparatus 100 associates object information related to the shape and the location of a virtual object with service information and stores them, and sends the object information and the service information stored in the virtual-object management DB 42 to the digital camera 300 in response to a transmission request sent from the digital camera 300. When the digital camera 300 determines from the obtained location information and the received object information that the digital camera 300 is disposed in the inside area of the virtual object identified by the shape and location of the virtual object, it executes an action corresponding to the virtual object, according to the received service information.

With these operations, a virtual object has a shape and a location, and it is determined whether the digital camera 300 is disposed in the inside area of the virtual object. Since an area where service is provided is relatively clarified compared with a conventional case, different services can be provided in fine units, such as in units of several meters. In addition, since an area where service is provided is not a point but has a predetermined range, the user is more likely to receive the service.

Further, in the present embodiment, the virtual-object management apparatus 100 associates object information with service information which specifies the contents of an action of the digital camera 300 and stores them. When the digital camera 300 determines according to obtained location information and received object information that the digital camera 300 is disposed in the inside area of a virtual object, capturing with the use of the digital camera 300 is prohibited according to received service information.

With these operations, since the operation of the digital camera 300 is controlled according to the movement of the user, not only an information providing service but a variety of services can be received. In the present embodiment, the art museum receives a service of capturing prohibition.

In addition, in the present embodiment, the virtual-object management apparatus 100 performs an input related to creation, deletion, or update of object information, according to communication with the virtual-object-setting apparatus 200, and creates, deletes, or updates object information according to the contents of the input.

Therefore, since it becomes easier to create, delete, or update virtual objects, the art museum can relatively flexibly handle a change in situation, such as a location shift of an exhibition or an increase or decrease of the number of exhibitions.

Further, in the present embodiment, the digital camera 300 performs the analysis processing of object information.

Therefore, the processing load of the virtual-object management apparatus 100 is reduced.

Furthermore, in the present embodiment, the digital camera 300 executes an action.

Therefore, the processing load of the virtual-object management apparatus 100 is reduced.

In the above embodiment, service information corresponds to action information, or to media information; the virtual-object management apparatus 100 corresponds to a management terminal; and the digital camera 300 corresponds to a mobile member, or to a portable terminal. The virtual-object management DB 42 corresponds to storage means; the location-information acquisition apparatus 86 corresponds to location-information acquisition means; and steps S112, S114, S206, S222, S306, S328, and S330 correspond to input means.

In the above embodiment, steps S116, S224, and S332 correspond to object-information processing means.

In the above embodiment, the analysis processing of object information is performed by the digital camera 300. The configuration is not limited to this case. The analysis processing of object information may be performed by the virtual-object management apparatus 100.

In this case, the processing load of the digital camera 300 is reduced.

In the above embodiment, the execution of an action is performed by the digital camera 300. The configuration is not limited to this case. The execution of an action may be performed by the virtual-object management apparatus 100.

In this case, the processing load of the digital camera 300 is reduced.

In the above embodiment, one action is associated with one virtual object. Association is not limited to this case. A plurality of actions (actions of capturing prohibition and indication of a description in the above embodiment) may be associated with one virtual object.

In the above embodiment, the present invention is applied to a case in which capturing pictures is prohibited in an art museum. The following variations can be proposed.

In a first variation, when an action of printing at a printer is associated with a virtual object, and the virtual object is virtually disposed in an area which includes the printer, for example, when a person who carries the digital camera 300 approaches the printer, capturing data of the digital camera 300 is automatically printed. In this case, if a confirmation and a response are sent to and from the user of the digital camera 300 before printing, it is more convenient.

In a second variation, when an action of displaying an advertisement is associated with a virtual object, and the virtual object is disposed, for example, at an entrance of a building having a shopping mall, if a person having a portable telephone having the function of the above digital camera passes through the entrance of the building, an advertisement of a shop in the shopping mall is displayed on the portable terminal.

In the above embodiment, when the digital camera 300 determines according to the interpretation result of step S414 that the digital camera 300 is not disposed in the inside area of a virtual object, capturing prohibition is released. Release of capturing prohibition is not limited to this case. When a viewer goes away from the inside area of a virtual object, if the digital camera 300 receives a notice telling that object information does not exist, from the virtual-object management apparatus 100, capturing prohibition may be released.

In the above embodiment, virtual objects are set in a fixed manner. Setting of a virtual object is not limited to this case. A virtual object may be set in a movable manner. A virtual object can be set so as to appear or disappear according to a time condition. For example, a virtual object appears at a predetermined place at a predetermined time, makes a predetermined movement, and when a predetermined period elapses from that point of time, the virtual object disappears. Therefore, a change in condition in terms of place and time can be handled in a relatively flexible manner.

In the above embodiment, object information and service information are transmitted and received by radio. A transfer method is not limited to this case. The information may be transferred through a network. Alternatively, the information is stored in a storage medium, such as an IC-card chip or a two-dimensional bar code, and transferred through it.

In the above embodiment, the digital camera 300 stores in advance a program (corresponding to processing shown in FIG. 14) for interpreting object information and service information. Interpretation of the information is not limited to this case. The object information and the service information may be interpreted in a way in which the digital camera 300 does not have such a program, the virtual-object management apparatus 100 includes the program in the object information and sends them, the digital camera 300 only gives location information to the received program, and the program is executed to interpret the object information and the service information.

Therefore, a new service can be received just by modifying the program of the virtual-object management apparatus 100 without changing the internal setting of the digital camera 300.

In the above embodiment, object information and service information are stored in the virtual-object management apparatus 100. Storage of the information is not limited to this case. The object information and the service information may be stored in different apparatuses with the virtual-object management apparatus 100 storing only access information (such as short cuts) for accessing the information. In this case, the digital camera 300 obtains the access information from the virtual-object management apparatus 100, and obtains the object information and the service information according to the access information.

In the above embodiment, service is provided by actions of capturing prohibition and an indication of a description. The service is not limited to this case. Notice information related to a notice, or guidance information related to a guidance may be provided.

In the above embodiment, the digital camera 300 and the virtual-object-setting apparatus 200 cooperate to provide the service. The structure is not limited to this case. With the use of a projector, a printer, a personal computer, an audio unit, a scanner, a PDA, a portable telephone, a watch-type PDA, or a point-of-sale (POS) terminal instead of the digital camera 300, the used unit and the virtual-object-setting apparatus 200 may cooperate to provide the service.

When a projector is used, a virtual object is formed, for example, at the projector or near the projector. When it is determined that a mobile member, such as a card or a portable telephone, is disposed in the inside area of the virtual object, projection service is provided by the projector. When a printer, a personal computer, a scanner, an audio unit, or a POS terminal is used, service unique to the used unit can be provided in the same manner as for the projector.

When a PDA is used, when it is determined that the PDA is disposed in the inside area of a virtual object formed at a place, predetermined service is provided in the same manner as for the digital camera 300 used in the above embodiment. When a portable telephone or a watch-type PDA is used, predetermined service can be provided in the same manner as for the PDA.

In the above embodiment, control programs stored in advance in the ROMs 32, 52, and 72 are executed to perform the processing shown in the flowcharts of FIG. 5 to FIG. 8, FIG. 10 to FIG. 12, and FIG. 14. Execution of the processing is not limited to this case. Programs showing the procedures, stored in storage media may be read into the RAM 34, 54, and 74 for execution.

The storage media include any recording media, such as semiconductor media, including a RAM and a ROM; magnetic storage media, including a floppy disk and a hard disk; optical-reading storage media, such as a CD, a CDV, an LD, and a DVD; and magnetic-storage/optical-reading storage media, including an MO, which can be read by computers irrespective of reading methods, such as an electronic method, a magnetic method, and an optical method.

In the above embodiment, a service providing system, a management terminal, a mobile member, a service providing program, and a service providing method according to the present invention are applied to a case in which, as shown in FIG. 1 and FIG. 2, the virtual-object-setting apparatus 200 disposes and sets the cubic virtual objects A and B in front of the pictures A and B exhibited on a wall surface in the art museum, and capturing by the use of the digital camera 300 is prohibited in the inside areas of the virtual objects A and B. Application of the present invention is not limited to this case. The present invention can also be applied to other cases within the scope and spirit of the present invention.

As described above, according to service providing systems specified in the present invention, a virtual object has a shape and a location, and it is determined whether the mobile member is disposed in the inside area of the virtual object. Since an area where service is provided is relatively clarified compared with a conventional case, different services can be provided in fine units, such as in units of several meters. In addition, since an area where service is provided is not a point but has a predetermined range, the user obtains an advantage of being more likely to receive the service.

Further, according to a service providing system specified in the present invention, since the management terminal makes a determination, an advantage is also obtained in which the processing load of the mobile member is reduced.

Further, according to a service providing system specified in the present invention, since the mobile member makes a determination, an advantage is also obtained in which the processing load of the management terminal is reduced.

Further, according to a service providing system specified in the present invention, since the management terminal provides service, an advantage is also obtained in which the processing load of the mobile member is reduced.

Further, according to a service providing system specified in the present invention, since the mobile member provides service, an advantage is also obtained in which the processing load of the management terminal is reduced.

Further, according to a service providing system specified in the present invention, since it becomes easier to create, delete, or update virtual objects, an advantage is obtained that a change in situation, such as a construction of a new solid body, including a building, application to a solid body which is only temporarily located, including an exhibition, or information transfer between users, can be relatively flexibly handled.

Further, according to a service providing system specified in the present invention, an advantage is obtained that not only information providing service but a variety of service can be received.

Further, according to a service providing system specified in the present invention, an advantage is obtained that not only information providing service but a variety of service can be received.

Further, according to a service providing system specified in the present invention, since it becomes easier to create, delete, or update virtual objects, an advantage is obtained that a change in situation, such as a construction of a new solid body, including a building, application to a solid body which is only temporarily located, including an exhibition, or information transfer between users, can be relatively flexibly handled.

According to a management terminal specified in the present invention, the same advantage as that obtained from the service providing system specified in the present invention is obtained.

According to a mobile member specified in the present invention, the same advantage as that obtained from the service providing system specified in the present invention is obtained.

According to a service providing program specified in the present invention, the same advantage as that obtained from the service providing system specified in the present invention is obtained.

According to a service providing program specified in the present invention, the same advantage as that obtained from the service providing system specified in the present invention is obtained.

According to a service providing program specified in the present invention, the same advantage as that obtained from the service providing system specified in the present invention is obtained.

What is claimed is:

1. A service providing system for correlating service to a virtual object which is data having spatial information, relating to shape and location, constructed on a computer corresponding to a specified space, for disposing the virtual object in a virtual space associated with an actual space, and for providing service corresponding to the specified space according to a positional relationship between a movable mobile member and the virtual object, comprising:

a storage device that associates object information related to the spatial information of the virtual object with service information specifying a service content, and that stores the object information and service information; and a location-information acquisition device that obtains location information used for identifying a location of the mobile member, when it is determined according to the location information obtained by the location-information acquisition device and the object information stored in the storage device that the mobile member is disposed in an inside area of the specified space identified by the shape and location of the virtual object, service corresponding to the specified space being provided according to the service information stored in the storage device, the service including restriction of a specific action, the object information including information, the information providing a preset time duration for appearance of the virtual object, and the shape of the virtual object including a sphere or a cube.

2. A service providing system according to claim 1, the mobile member and a management terminal that manages the specified space being connected in a communication-allowed manner;

the mobile member includes the location-information acquisition device, and sends the location information obtained by the location-information acquisition device to the management terminal; and the management terminal having the storage device, and when the management terminal receives the location information, the management terminal determines, according to the received location information and the object information stored in the storage device, whether the mobile member is disposed in the inside area of the specified space identified by the shape and location of the virtual object.

3. A service providing system according to claim 2, wherein, when the result of the determination indicates that the mobile member is disposed in the inside area of the specified space identified by the shape and location of the virtual object, the management terminal provides service corresponding to the virtual object based on the service information stored in the storage device.

4. A service providing system according to claim 2, the management terminal sending the service information stored in the storage device to the mobile member in advance, and when the result of the determination indicates that the mobile member is disposed in the inside area of the specified space identified by the shape and location of the virtual object, the mobile member provides service corresponding to the specified space based on the received service information.

5. A service providing system according to claim 2, the management terminal further comprising:

an input device that performs an input related to at least one of generation, update and deletion of the object information; and an object-information processing device that performs at least one of generating, updating and deleting the object information according to the content of the input performed by the input device.

6. A terminal connected to the mobile member used in a service providing system according to claim 2 in a communication-allowed manner, comprising a storage device, wherein, when the terminal receives the location information, the terminal determines, according to the received location information and the object information stored in the storage device, whether the mobile member being disposed in the inside area of the specified space identified by the shape and location information of the virtual object.

7. A service providing system according to claim 1, the mobile member and a management terminal that manages the virtual object being connected in a communication-allowed manner;

the management terminal includes the storage device, and sends the object information stored in the storage device to the mobile member; and the mobile member includes the location-information acquisition device, and when the mobile member receives the object information, the mobile member determines, according to the location information obtained by the location-information acquisition device and the received object information, whether the mobile member is disposed in the inside area of the specified space identified by the shape and location of the virtual object.

8. A mobile member connected to the management terminal used in a service providing system according to claim 7 in a communication-allowed manner, comprising a location-information acquisition device, wherein, when the mobile member receives the object information, the mobile member determines, according to the location information obtained by the location-information acquisition device and the received object information, whether the mobile member being disposed in the inside area of the specified space identified by the shape and location of the virtual object.

9. A service providing system according to claim 1, the service information being operation information specifying a content of an operation of the mobile member or another apparatus, and when it is determined that the mobile member is disposed in the inside area of the specified space identified by the shape and location of the virtual object, the mobile member or the another apparatus is operated based on the operation information corresponding to the specified space stored in the storage device.

10. A service providing system according to claim 1, the service information specifying a content of service in which media information related to at least one of characters, images, and video is provided for the mobile member, and when it is determined that the mobile member is disposed in the inside area of the specified space identified by the shape and location of the virtual object, the media information is provided for the mobile member based on the service information corresponding to the specified space, stored in the storage device.

11. A service providing system according to claim 1, the service information specifying a content of service in which notice information related to at least one of a notice and guidance information related to a guidance is provided for the mobile member, and when it is determined that the mobile member is disposed in the inside area of the specified space identified by the shape and location of the virtual object, the notice information and the guidance information are provided for the mobile member based on the service information corresponding to the specified space, stored in the storage device.

12. A service providing system according to claim 1, the mobile member being a portable terminal.

13. A service providing system according to claim 1, the system further comprising:

an input device that generates the data for the virtual object, the input device transmitting the data to the storage device, the storage device registering the data and associating the object information with the service information.

14. A service providing system for correlating service to a virtual object which is data having spatial information, relating to shape and location, constructed on a computer corresponding to a specified space, for disposing the virtual object in a virtual space associated with an actual space, and for providing service corresponding to the specified space based on a positional relationship between a movable mobile member and the specified space, comprising:

a storage device that associates object information related to the virtual object with operation information specifying a content of an operation of the mobile member or another apparatus, and that stores the object information and the operation information, when it is determined, according to the object information stored in the storage device, that the positional relationship between the mobile member and the specified space satisfies a predetermined condition, the mobile member or the another apparatus being operated based on the operation information corresponding to the specified space stored in the storage device, the operation including restriction of a specific action, the object information including information, the information providing a preset time duration for appearance of the virtual object, and the shape of the virtual object including a sphere or a cube.

15. A service providing system according to claim 14, the system further comprising:

an input device that generates the data for the virtual object, the input device transmitting the data to the storage device, the storage device registering the data and associating the object information with the service information.

16. A service providing system for correlating service to a virtual object which is having spatial information, relating to shape and location, constructed on a computer corresponding to a specified space, for disposing the virtual object in a virtual space associated with an actual space, and for providing service corresponding to the specified space according to a positional relationship between a movable mobile member and the virtual object, comprising:

a storage device that associates object information related to the virtual object with service information specifying the content of service, and that stores the object information and service information;

an input device that performs an input related to at least one of generation, update and deletion of the object information; and an object-information processing device that performs at least one of generating, updating and deleting the object information according to the content of the input performed by the input device, when it is determined according to the object information stored in the storage device that the positional relationship between the mobile member and the specified space satisfies a predetermined condition, the service corresponding to the specified space being provided based on the service information stored in the storage device, the service including restriction of a specific action, the object information including information, the information providing a preset time duration for appearance of the virtual object, and the shape of the virtual object including a sphere or a cube.

17. A computer readable medium that stores a service providing program for correlating service to a virtual object which is data having a spatial information, relating to shape and location, constructed on a computer corresponding to a specified space, for disposing the virtual object in a virtual space associated with an actual space, and for providing service corresponding to the specified space according to a positional relationship between a movable mobile member and the virtual object, the program making a computer, which is capable of using a storage device that associates and stores object information related to the shape and location of the virtual object with service information specifying a service content, and a location-information acquisition device that obtains location information used for identifying the location of the mobile member, the program comprising:

instructions for, when it is determined according to the location information obtained by the location-information acquisition device and the object information stored in the storage device that the mobile member is disposed in the inside area of the specified space identified by the shape and location of the virtual object, the object information including information, the information providing a preset time duration for appearance of the virtual object, providing the service corresponding to the specified space based on the service information and the information stored in the storage device, the service including a restriction of a specific action, the shape of the virtual object including a sphere or a cube.

18. A computer readable medium storing the service providing program according to claim 17, the program further comprising:

instructions for implementing an input device that generates the object information and transmits the object information to the storage device.

19. A computer readable medium that stores a service providing program for correlating service to a virtual object which is data having a spatial information, relating to shape and location, constructed on a computer corresponding to a specified space, for disposing the virtual object in a virtual space associated with an actual space, and for providing service corresponding to the specified space according to a positional relationship between a movable mobile member and the specified space, the program making a computer, which is capable of using a storage device that associates and stores object information related to the virtual object with operation information specifying a content of an operation of the mobile member or another apparatus, the program comprising:

instructions for, when it is determined according to the object information stored in the storage device that the positional relationship between the mobile member and the specified space satisfies a predetermined condition, the object information including information, the information providing a preset time duration for construction appearance of the virtual object, operating the mobile member or the another apparatus based on the operation information corresponding to the specified space and the information stored in the storage device, the operation including a restriction of a specific action, the shape of the virtual object including a sphere or a cube.

20. A computer readable medium storing the service providing program according to claim 19, the program further comprising:

instructions for implementing an input device that generates the object information and transmits the object information to the storage device.

21. A computer readable medium storing a service providing program for correlating service to a virtual object having spatial information, relating to shape and location, constructed on a computer corresponding to a specified space, for disposing the virtual object in a virtual space associated with an actual space, and for providing service corresponding to the specified space according to a positional relationship between a movable mobile member and the specified space, the program making a computer, which is capable of using a storage device that associates and stores object information related to the virtual object with service information specifying the content of service, the object information including information, the program comprising:

instructions for, when it is determined according to the object information stored in the storage device that the positional relationship between the mobile member and the specified space satisfies a predetermined condition, the object information including information, the information providing a preset time duration for appearance of the virtual object, providing the service corresponding to the specified space based on the service information and the information stored in the storage device, the service including a restriction of a specific action;

instructions for performing an input related to at least one of generation, update and deletion of the object information; and instructions for performing at least one of generating, updating and deleting the object information according to a content of the input performed by an input device, the shape of the virtual object including a sphere or a cube.

22. A service providing method for correlating service to a virtual object having spatial information, relating to shape and location, constructed on a computer corresponding to a specified space, for disposing the virtual object in a virtual space associated with an actual space, and for providing service corresponding to the specified space based on a positional relationship between a movable mobile member and the specified space, comprising:

associating and storing object information related to the shape and location of the virtual object with service information specifying a service content, the object information including information, the information providing a preset time duration for appearance of the virtual object;

obtaining location information used for identifying the location of the mobile member; and when it is determined, according to the obtained location information and the stored object information, that the mobile member is disposed in the inside area of the specified space identified by the shape and location of the virtual object, providing service corresponding to the specified space according to the stored service information and the stored information, the service including a restriction of a specific action, the shape of the virtual object including a sphere or a cube.

23. A service providing method according to claim 22, the method further comprising:

generating data for the virtual object and transmitting the data to a storage device for registering.

24. A service providing method for correlating service to a virtual object having spatial information, relating to shape and location, constructed on a computer corresponding to a specified space, for disposing the virtual object in a virtual space associated with an actual space, and for providing service corresponding to the specified space according to a positional relationship between a movable mobile member and the specified space, comprising:

associating and storing object information related to the virtual object with operation information specifying the content of an operation of the mobile member or another apparatus, the object information including information, the information providing a preset time duration for appearance of the virtual object; and when it is determined according to the stored object information that the positional relationship between the mobile member and the specified space satisfies a predetermined condition, the mobile member or the another apparatus is operated based on the stored operation information corresponding to the specified space and the stored information, the operation including a restriction of a specific action, the shape of the virtual object including a sphere or a cube.

25. A service providing method according to claim 24, the method further comprising:

generating data for the virtual object and transmitting the data to a storage device for registering.

26. A service providing method for correlating service to a virtual object which is data having spatial information, relating to shape and location, constructed on a computer corresponding to a specified space, for disposing the virtual object in a virtual space associated with an actual space, and for providing service corresponding to the specified space according to a positional relationship between a movable mobile member and the specified space, comprising:

associating and storing object information related to the virtual object with service information specifying the content of service, the object information including information, the information providing a preset time duration for appearance of the virtual object;

when it is determined according to the stored object information that the positional relationship between the mobile member and the specified space satisfies a predetermined condition, providing the service corresponding to the specified space based on the stored service information and the information, the service including a restriction of a specific action;

performing an input related to at least one of generation, update and deletion of the object information; and at least one of generating, updating and deleting the object information based on the content of the performed input, the shape of the virtual object including a sphere or a cube.

27. A service providing system for correlating service to a virtual object which is having spatial information, relating to shape and location, constructed on a computer corresponding to a specified space, for disposing the virtual object in a virtual space associated with an actual space in the specified space, and for providing service corresponding to the specified space according to a positional relationship between a movable mobile member and the virtual object, comprising:

a storage device that associates object information related to the virtual object with service information specifying the content of service, and that stores the object information and service information;

a mobile input device that performs an input related to at least one of generation, update and deletion of at least one of the object information and the service information related to the virtual object; and an object-information processing device that performs at least one of generating, updating and deleting the at least one of the object information and the service information related to the virtual object according to the content of the input performed by the mobile input device, when it is determined according to the object information stored in the storage device that the positional relationship between the mobile member and the specified space satisfies a predetermined condition, the service corresponding to the specified space is provided based on the service information stored in the storage device, and when it is determined according to the object information stored in the storage device that the positional relationship between the mobile input device and the specified space satisfies a predetermined condition, the object-information processing device performing at least one of generation, deletion and update of the at least one of the object information and the service information according to the content of the mobile input performed by the mobile input device, the shape of the virtual object including a sphere or a cube, the object information including information that provides a preset time duration for appearance of the virtual object.

28. A computer readable medium storing a service providing program for correlating service to a virtual object which is data having a spatial information, relating to shape and location, constructed on a computer corresponding to a specified space, for disposing the virtual object in a virtual space associated with an actual space in the specified space, and for providing service corresponding to the specified space according to a positional relationship between a movable mobile member and the virtual object, the program making a computer, which is capable of using a storage device that associates and stores object information related to the shape and location of the virtual object with service information specifying a service content, and a location-information acquisition device that obtains location information used for identifying the location of the mobile member, the program comprising:

instructions for performing an input related to at least one of generation, update and deletion of at least one of the object information and the service information, instructions for performing at least one of generation, update and deletion of the at least one of the object information and the service information according to a content of the input performed by a mobile input device, instructions for, when it is determined according to the location information obtained by the location-information acquisition device and the object information stored in the storage device that the mobile member is disposed in the inside area of the specified space identified by the shape and location of the virtual object, providing the service corresponding to the specified space based on the service information stored in the storage device; and instructions for, when it is determined according to the object information stored in the storage device that the positional relationship between the mobile input device and the specified space satisfies a predetermined condition, performing at least one of generation, update, and deletion of the at least one of the object information and the service information according to the content of the input performed by the mobile input device, the shape of the virtual object including a sphere or a cube, the object information including information that provides a preset time duration for appearance of the virtual object.

29. A service providing method for correlating service to a virtual object having spatial information, relating to shape and location, constructed on a computer corresponding to a specified space, for disposing the virtual object in a virtual space associated with an actual space in the specified space, and for providing service corresponding to the specified space based on a positional relationship between a movable mobile member and the specified space, comprising:

associating and storing object information related to the shape and location of the virtual object with service information specifying a service content;

obtaining location information used for identifying the location of the mobile member;

performing an input related to at least one of generation, update and deletion of at least one of the object information and the service information;

performing at least one of generation, update and deletion of the at least one of the object information and the service information according to a content of the input performed by a mobile input device;

when it is determined, according to the obtained location information and the stored object information, that the mobile member is disposed in the inside area of the specified space identified by the shape and location of the virtual object, providing service corresponding to the specified space according to the stored service information; and when it is determined according to the object information stored in the storage device that the positional relationship between the mobile input device and the specified space satisfies a predetermined condition, performing at least one of generation, update and deletion of the at least one of the object information and the service information according to the content of the input performed by the mobile input device, the shape of the virtual object including a sphere or a cube, the object information including information that provides a preset time duration for appearance of the virtual object.

\* \* \* \* \*